US012581318B2

(12) United States Patent
Singh et al.

(10) Patent No.: US 12,581,318 B2
(45) Date of Patent: Mar. 17, 2026

(54) NETWORK TOPOLOGY FOR EFFICIENT AND PERFORMANT VIRTUAL WANs

(71) Applicant: Microsoft Technology Licensing, LLC, Redmond, WA (US)

(72) Inventors: Rachee Singh, Ithaca, NY (US); Anjali, Madison, WI (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 381 days.

(21) Appl. No.: 18/313,846

(22) Filed: May 8, 2023

(65) Prior Publication Data

US 2024/0314577 A1 Sep. 19, 2024

Related U.S. Application Data

(60) Provisional application No. 63/451,850, filed on Mar. 13, 2023.

(51) Int. Cl.
| | |
|---|---|
| *H04W 16/18* | (2009.01) |
| *H04L 43/0852* | (2022.01) |
| *H04W 24/08* | (2009.01) |

(52) U.S. Cl.
CPC ......... *H04W 16/18* (2013.01); *H04L 43/0852* (2013.01); *H04W 24/08* (2013.01)

(58) Field of Classification Search
CPC .... H04W 16/18; H04W 24/08; H04L 43/0852
(Continued)

(56) References Cited

U.S. PATENT DOCUMENTS

2020/0028746 A1* 1/2020 Zawadzki ........... H04L 41/5009
2022/0006756 A1* 1/2022 Ramaswamy ......... H04L 45/64
(Continued)

FOREIGN PATENT DOCUMENTS

CN 113196723 A 7/2021

OTHER PUBLICATIONS

Singh et al., Cost-effective Cloud Edge Traffic Engineering with Cascara, 18th USENIX Symposium on Networked Systems Design and Implementation (NSDI 21), pp. 201-216, 2021 (Year: 2021).*
(Continued)

*Primary Examiner* — Nicholas R Taylor
*Assistant Examiner* — Chong G Kim
(74) *Attorney, Agent, or Firm* — ArentFox Schiff LLP

(57) ABSTRACT

The present application relates to a system, apparatus, and method of selecting a topology for a virtual wide area network (vWAN). A wide area network (WAN) includes a plurality of geographically distributed entry points and a plurality of edge datacenters. Each edge datacenter is associated with an entry point and includes computing resources for hosting a vWAN hub. A vWAN manager is configured to: obtain latency measurements from different metropolitan regions to the entry points; receive a set of the metropolitan regions and a number of expected connections for each metropolitan region; and select a plurality of vWAN hub locations at selected edge datacenters, each selected edge datacenter being associated with a non-empty subset of the metropolitan regions. A weighted latency for the plurality of vWAN hub locations based on the latency measurements and the expected connections is minimized for a number of the selected edge datacenters.

20 Claims, 11 Drawing Sheets

(58) Field of Classification Search

USPC ......................................................... 370/254

See application file for complete search history.

(56) References Cited

U.S. PATENT DOCUMENTS

| 2022/0201673 | A1 | | 6/2022 | Pandey | |
|---|---|---|---|---|---|
| 2023/0379210 | A1 | * | 11/2023 | Janakiraman | ....... H04L 41/0846 |
| 2024/0414520 | A1 | * | 12/2024 | Lu | ......... H04W 8/186 |
| 2025/0168101 | A1 | * | 5/2025 | Ramaswamy | ...... H04L 41/0895 |

OTHER PUBLICATIONS

Anjali et al., Cost-effective and performant virtual WANs with Cornifer, arXiv retrieved from https://arxiv.org/abs/2401.09620, 2024 (Year: 2024).*

Singh et al., Cost-effective capacity provisioning in wide area networks with Shoofly, ACM SIGCOMM 2021, Aug. 2021 (Year: 2021).*

Babasanmi, et al., "Measuring Cloud Latency in Africa," 2022 IEEE 11th International Conference on Cloud Networking, Nov. 7, 2022, pp. 61-66.

International Search Report and Written Opinion received for PCT Application No. PCT/US2024/018452, Jun. 13, 2024, 16 pages.

Yan, et al., WAN as a service for cloud via software-defined network and open APIs, 2015 IEEE Conference on Computer Communications Workshops, Apr. 26, 2015, pp. 9-10.

"Amazon ec2: Secure and resizable compute capacity for virtually any workload", Retrieved From: https://aws.amazon.com/ec2/, Retrieved on: Nov. 23, 2022, 7 Pages.

"AWS Cloud WAN", Retrieved From: https://aws.amazon.com/cloud-wan/, Retrieved on: Nov. 23, 2022, 6 Pages.

"Introduction to IWAN and PfRv3", Retrieved From: https://www.cisco.com/c/en/us/support/docs/ios-nx-os-software/performance-routing-pfr/200281-Introduction-To-IWAN-And-PfRv3.html, Feb. 19, 2021, 5 Pages.

"Magic WAN", Retrieved From: https://www.cloudflare.com/magic-wan/, Retrieved on: Nov. 23, 2022, 13 Pages.

"scipy.stats.ttest_ind", Retrieved From: https://docs.scipy.org/doc/scipy/reference/generated/scipy.stats.ttest_ind.html, Retrieved on: Nov. 23, 2022, 4 Pages.

"Virtual WAN", Retrieved From: https://azure.microsoft.com/en-us/products/virtual-wan/#overview, Retrieved on: Nov. 23, 2022, 15 Pages.

"Virtual WAN pricing", Retrieved From: https://azure.microsoft.com/en-us/pricing/details/virtual-wan/#pricing, Retrieved on: Nov. 23, 2022, 9 Pages.

Agrawal, et al., "A rewriting system for convex optimization problems", In Journal of Control and Decision, vol. 5, Issue 1, Jan. 2, 2018, pp. 42-60.

Andersen, et al., "Resilient overlay networks", In Proceedings of the eighteenth ACM symposium on Operating Systems Principles, Oct. 21, 2001, pp. 131-145.

Yap, "Taking the Edge off With Espresso: Scale, Reliability and Programmability for Global Internet Peering", In Proceedings of the Conference of the ACM Special Interest Group on Data Communication, Aug. 7, 2017, pp. 432-445.

Balakrishnan, et al., "Analyzing stability in wide-area network performance", In Proceedings of Analyzing stability In wide-area network performance, Jun. 1, 1997, pp. 2-12.

Calder, et al., "Analyzing the Performance of an Anycast CDN", In Proceedings of the Internet Measurement Conference, Oct. 28, 2015, pp. 531-537.

Calder, et al., "Odin: Microsoft's Scalable Fault-Tolerant CDN Measurement system", In Proceedings of 15th USENIX Symposium on Networked Systems Design and Implementation, Apr. 9, 2018, pp. 501-517.

Clark, et al., "Overlay Networks and the Future of the Internet", In Proceedings of Communications and Strategies 63, Jul. 2006, pp. 109-129.

Diamond, et al., "CVXPY: A Python-Embedded Modeling Language for Convex Optimization", In Journal of Machine Learning Research, vol. 17, Issue 83, Mar. 3, 2016, pp. 1-5.

Han, et al., "Topology Aware Overlay Networks", In Proceedings of IEEE 24th Annual Joint Conference of the IEEE Computer and Communications Societies, vol. 4, Aug. 22, 2005, pp. 2554-2565.

Hong, et al., "Achieving High Utilization with Software-Driven WAN", In Proceedings of the ACM SIGCOMM 2013 Conference on SIGCOMM, Aug. 27, 2013, pp. 15-26.

Jain, et al., "B4: Experience with a Globally-Deployed Software Defined WAN", In Journal of ACM SIGCOMM Computer Communication Review, vol. 43, Issue 4, Aug. 27, 2013, pp. 3-14.

Jalaparti, et al., "Dynamic Pricing and Traffic Engineering for Timely Inter-Datacenter Transfers", In Proceedings of the ACM SIGCOMM Conference, Aug. 22, 2016, pp. 73-86.

McGuire, et al., "Virtual WAN FAQ", Retrieved From: https://learn.microsoft.com/en-us/azure/virtual-wan/virtual-wan-faq, Nov. 9, 2022, 23 Pages.

Pathan, et al., "Overlay networks: An akamai perspective", In Publication of Advanced Content Delivery, Streaming, and Cloud Services, vol. 51, Issue 4, Oct. 2014, pp. 305-328.

Schlinker, et al., "Engineering Egress with Edge Fabric: Steering Oceans of Content to the World", In Proceedings of the Conference of the ACM Special Interest Group on Data Communication, Aug. 7, 2017, pp. 418-431.

Sen, et al., "Can They Hear Me Now? A Case for a Client-Assisted Approach to Monitoring Wide-Area Wireless Networks", In Proceedings of the ACM SIGCOMM conference on Internet measurement conference, Nov. 2, 2011, pp. 99-116.

Singh, et al., "Cost-Effective Capacity Provisioning in Wide Area Networks with Shoofly", In Proceedings of the ACM SIGCOMM Conference, Aug. 9, 2021, pp. 534-546.

Singh, et al., "Cost-Effective Cloud Edge Traffic Engineering with Cascara", In Proceedings of 18th USENIX Symposium on Networked Systems Design and Implementation (NSDI 21), Apr. 12, 2021, pp. 201-216.

Singh, et al., "Radwan: Rate Adaptive Wide Area Network", In Proceedings of the Conference of the ACM Special Interest Group on Data Communication, Aug. 7, 2018, pp. 547-560.

International Preliminary Report on Patentability (Chapter I) received for PCT Application No. PCT/US2024/018452, mailed on Sep. 25, 2025, 10 Pages.

* cited by examiner

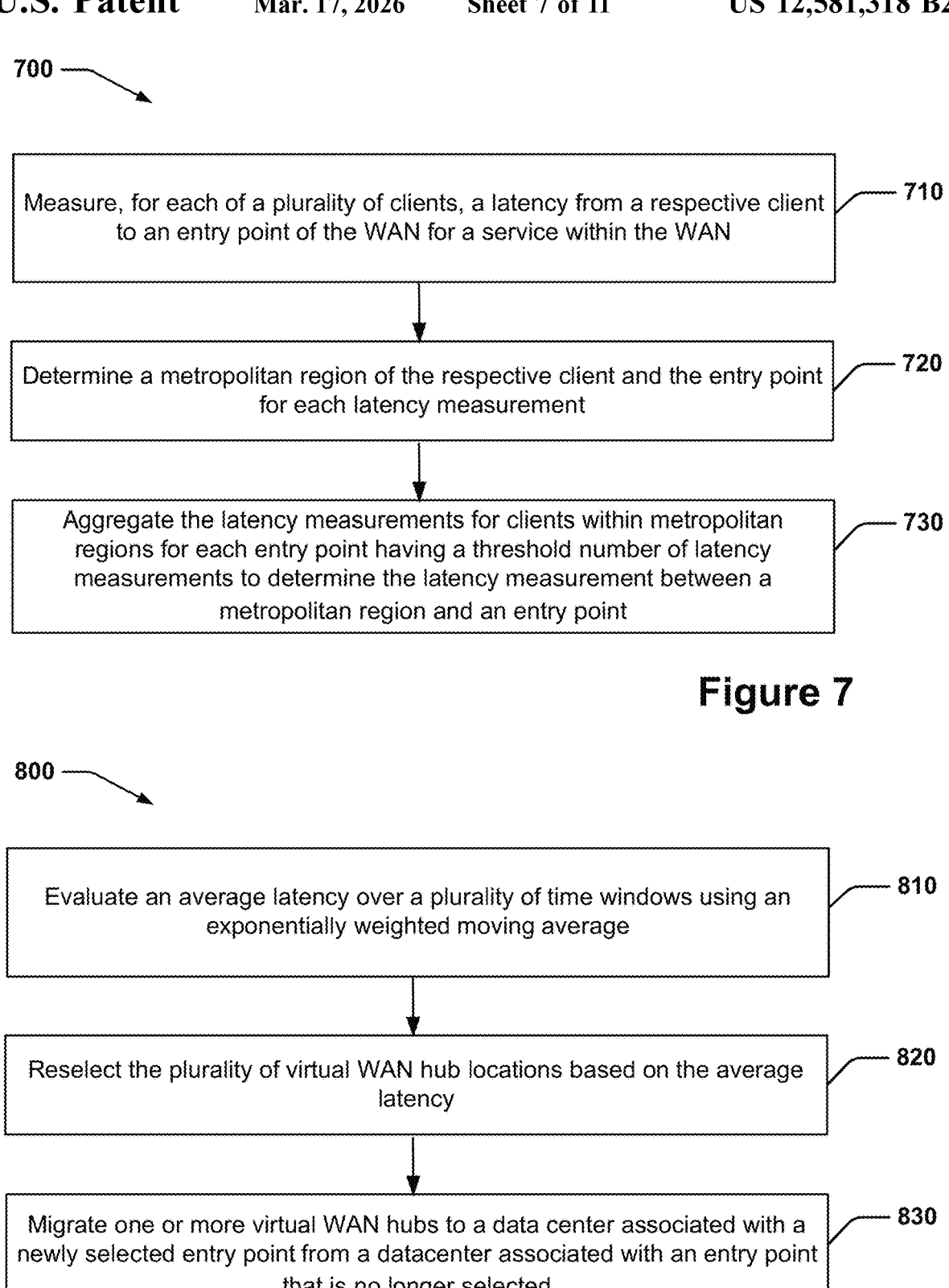

700 —

Measure, for each of a plurality of clients, a latency from a respective client to an entry point of the WAN for a service within the WAN — 710

Determine a metropolitan region of the respective client and the entry point for each latency measurement — 720

Aggregate the latency measurements for clients within metropolitan regions for each entry point having a threshold number of latency measurements to determine the latency measurement between a metropolitan region and an entry point — 730

Evaluate an average latency over a plurality of time windows using an exponentially weighted moving average — 810

Reselect the plurality of virtual WAN hub locations based on the average latency — 820

Migrate one or more virtual WAN hubs to a data center associated with a newly selected entry point from a datacenter associated with an entry point that is no longer selected — 830

Figure 8

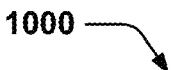
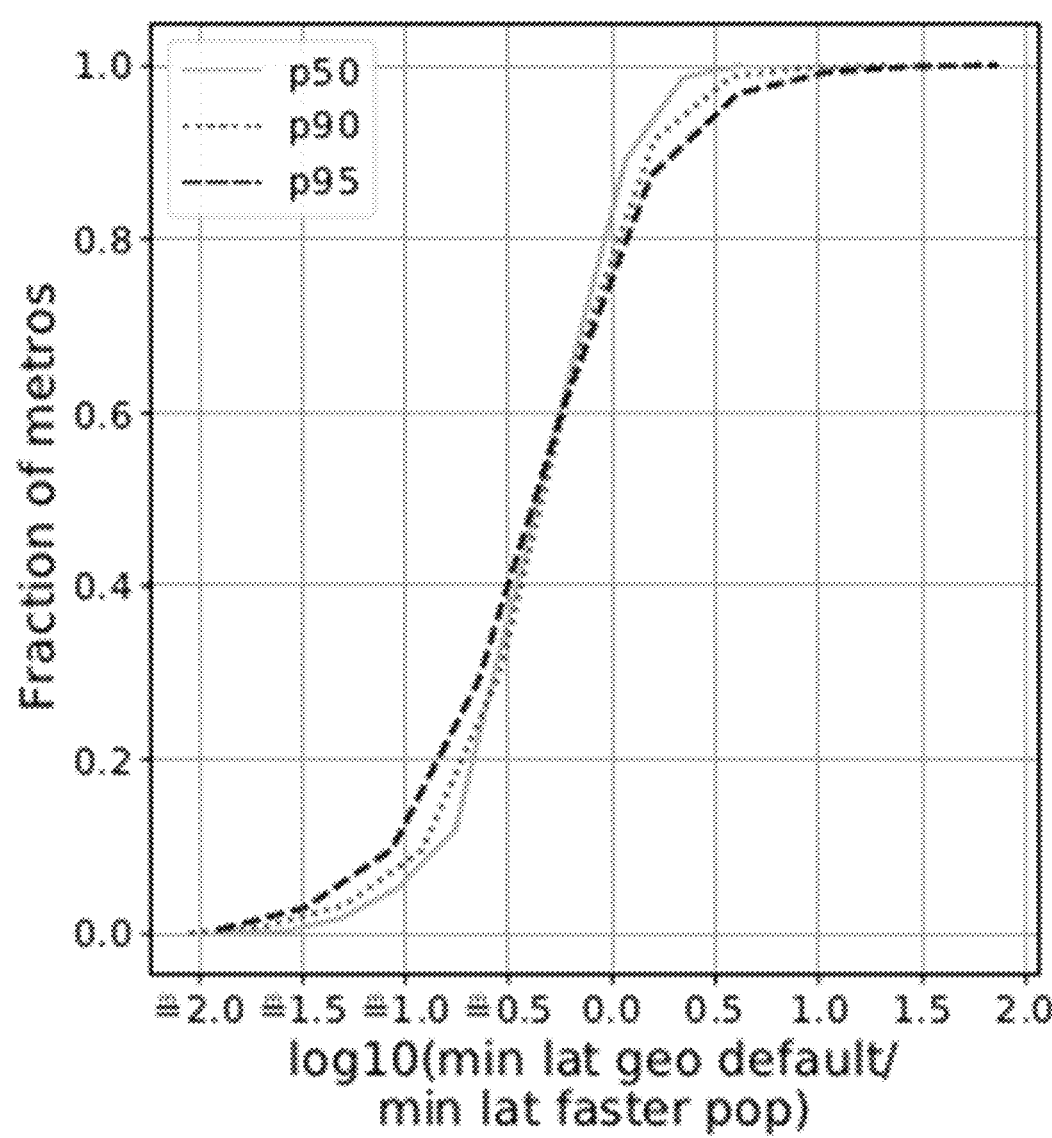
Figure 10

NETWORK TOPOLOGY FOR EFFICIENT AND PERFORMANT VIRTUAL WANs

CROSS REFERENCE TO RELATED APPLICATIONS

This application claims priority to U.S. Provisional Application No. 63/451,850 titled "NETWORK TOPOLOGY FOR EFFICIENT AND PERFORMANT VIRTUAL WANS," filed Mar. 13, 2023, which is assigned to the assignee hereof, and incorporated herein by reference in their entirety.

BACKGROUND

A cloud network may be implemented on a wide area network (WAN) that includes computing resources spread across a geographic region and connected via communication links such as fiber optic cables or satellite connectivity. A cloud provider may host cloud applications for its clients. For example, a cloud provider may provide infrastructure as a service (IaaS) services such as virtual machines (VM), platform as a service (PaaS) services such as databases and serverless computing, and software as a service (SaaS) services such as authentication platforms. The size of wide area networks may vary greatly from a small city to a global network. For example, a WAN may connect multiple offices of an enterprise, the customers of a regional telecommunications operator, or a global enterprise. The computing resources and connections within a WAN may be owned and controlled by the WAN operator.

Cloud providers may spend billions of dollars to provision and operate WANs that connect their globally-distributed datacenters. In contrast, enterprises lack the incentive and capital to build a dedicated WAN of their own. Instead, enterprises rely on the public Internet to connect their branch offices in different parts of the world. Recently, cloud providers have begun to offer virtualized wide-area networks (vWANs) to enterprise customers. Similar to virtualized compute in the cloud, virtualized WANs are WAN-as-a-service offerings that bring the performance improvements of a dedicated WAN to enterprises without significant infrastructural investment.

Clients of the cloud provider may obtain access to the cloud network or WAN via the Internet. A path between the client and the cloud network may include one or more Internet Service Providers (ISPs) or autonomous systems (AS). A WAN may include multiple peering links via which the WAN is connected to ASes. A geographic location of the peering links may be referred to as a point of presence (POP). In general, traffic traversing the Internet may be routed on a lowest cost basis. Accordingly, the WAN may not have significant control of routing decisions for clients connecting to a vWAN service. In some cases, the topology of a virtual WAN can render it both performance and cost inefficient. For example, an ISP or other AS may not efficiently route traffic to a vWAN hub that is geographically close to enterprise clients. Accordingly, the enterprise clients may experience greater latency than expected.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In some aspects, the techniques described herein relate to a wireless wide area network (WAN), including: a plurality of geographically distributed entry points including routers connected to other networks; a plurality of edge datacenters, each edge datacenter associated with one of the plurality of geographically distributed entry points, each edge datacenter including computing resources capable of hosting a virtual WAN hub; and a management datacenter including a memory storing computer-executable instructions, and at least one processor configured to execute the computer-executable instructions to: obtain latency measurements from different metropolitan regions to the plurality of geographically distributed entry points of the WAN; receive, from an enterprise client, a set of the metropolitan regions and a number of expected connections for each metropolitan region; and select a plurality of virtual WAN hub locations at selected edge datacenters of the plurality of edge datacenters, each selected edge datacenter being associated with a non-empty subset of the metropolitan regions, wherein a weighted latency for the plurality of virtual WAN hub locations based on the latency measurements and the expected connections is minimized for a number of the selected edge datacenters.

In some aspects, the techniques described herein relate to a WAN, wherein to obtain the latency measurements, the at least one processor is configured to execute the computer-executable instructions to: measure, for each of a plurality of clients, a latency from a respective client to an entry point of the WAN for a service within the WAN; determine a metropolitan region of the respective client and the entry point for each latency measurement; and aggregate the latency measurements for clients within metropolitan regions for each entry point having a threshold number of latency measurements to determine the latency measurement between a metropolitan region and an entry point.

In some aspects, the techniques described herein relate to a WAN, wherein the at least one processor is configured to execute the computer-executable instructions to receive, from the enterprise client, a service level objective defining an expected latency for one or more of the metropolitan regions, wherein selecting the plurality of virtual WAN hub locations includes selecting only edge datacenters associated with entry points that satisfy the expected latency for a metropolitan region.

In some aspects, the techniques described herein relate to a WAN, wherein to select the plurality of virtual WAN hub locations, the at least one processor is configured to execute the computer-executable instructions to solve a mixed integer linear program (MILP) to minimize a sum of latencies for selected entry points across the set of metropolitan regions for the number of expected connections for each metropolitan region.

In some aspects, the techniques described herein relate to a WAN, wherein the MILP is subject to: a first constraint that connections from one client metropolitan region go to only one virtual WAN hub associated with an entry point; and a second constraint that only one edge datacenter associated with an entry point is selected for one metropolitan region.

In some aspects, the techniques described herein relate to a WAN, wherein the MILP is further subject to a third constraint that the number of selected edge datacenters is less than a threshold.

In some aspects, the techniques described herein relate to a WAN, wherein the at least one processor is configured to execute the computer-executable instructions to solve the MILP for different values of the threshold to determine points on a Pareto optimal frontier for the latency and the number of selected edge datacenters.

In some aspects, the techniques described herein relate to a WAN, wherein the at least one processor is configured to execute the computer-executable instructions to select the number of edge datacenters based on a mean of a minimum feasible number of edge datacenters and a lowest latency number of edge datacenters.

In some aspects, the techniques described herein relate to a WAN, wherein the at least one processor is configured to execute the computer-executable instructions to select a number of virtual WAN hubs to instantiate at each of the plurality of virtual WAN hub locations based on the number of expected connections for each metropolitan region associated with a respective edge datacenter and a maximum number of connections per virtual WAN hub.

In some aspects, the techniques described herein relate to a WAN, wherein the at least one processor is configured to execute the computer-executable instructions to: evaluate an average latency for the virtual WAN over a plurality of time windows using an exponentially weighted moving average; reselect the plurality of virtual WAN hub locations based on the average latency; and migrate one or more virtual WAN hubs to a newly selected edge datacenter from a datacenter associated with an edge datacenter that is no longer selected.

In some aspects, the techniques described herein relate to a method including: obtaining latency measurements from different metropolitan regions to different entry points of a wide area network (WAN); receiving, from an enterprise client, a set of the metropolitan regions and a number of expected connections for each metropolitan region; and selecting a plurality of virtual WAN hub locations at selected datacenters within the WAN, each selected datacenter being associated with an entry point of the WAN and a non-empty subset of the metropolitan regions, wherein a weighted latency for the plurality of virtual WAN hub locations based on the latency measurements and the expected connections is on a Pareto optimal frontier of the weighted latency for a number of the selected datacenters.

In some aspects, the techniques described herein relate to a method, wherein obtaining the latency measurements includes: measuring, for each of a plurality of clients, a latency from a respective client to an entry point of the WAN for a service within the WAN; determining a metropolitan region of the respective client and the entry point for each latency measurement; and aggregating the latency measurements for clients within metropolitan regions for each entry point having a threshold number of latency measurements to determine the latency measurement between a metropolitan region and an entry point.

In some aspects, the techniques described herein relate to a method, further including receiving, from the enterprise client, a service level objective defining an expected latency for one or more of the metropolitan regions, wherein selecting the plurality of virtual WAN hub locations includes selecting only datacenters associated with entry points that satisfy the expected latency for a metropolitan region.

In some aspects, the techniques described herein relate to a method, wherein selecting the plurality of virtual WAN hub locations includes solving a mixed integer linear program (MILP) to minimize a sum of latencies for selected entry points across the set of metropolitan regions for the number of expected connections for each metropolitan region.

In some aspects, the techniques described herein relate to a method, wherein the MILP is subject to: a first constraint that connections from one client metropolitan region go to only one virtual WAN hub associated with an entry point; and a second constraint that only one datacenter associated with an entry point is selected for one client metropolitan.

In some aspects, the techniques described herein relate to a method; wherein the MILP is further subject to a third constraint that the number of entry points associated with a hub is less than a threshold.

In some aspects, the techniques described herein relate to a method, wherein selecting the plurality of virtual WAN hub locations includes solving the MILP for different values of the threshold to determine points on a Pareto optimal frontier.

In some aspects, the techniques described herein relate to a method, wherein selecting the plurality of virtual WAN hub locations includes selecting a number of entry points based on a mean of a minimum feasible number of entry points and a lowest latency number of entry points.

In some aspects, the techniques described herein relate to a method, further including selecting a number of virtual WAN hubs to instantiate at each of the plurality of virtual WAN hub locations based on the number of expected connections for each metropolitan region associated with an entry point and a maximum number of connections per virtual WAN hub.

In some aspects, the techniques described herein relate to a method, further including: evaluating an average latency over a plurality of time windows using an exponentially weighted moving average; reselecting the plurality of virtual WAN hub locations based on the average latency; and migrating one or more virtual WAN hubs to a datacenter associated with a newly selected entry point from a datacenter associated with an entry point that is no longer selected.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIG. 7 is a flow diagram of an example of a method for measuring latency from clients in metro regions to entry points of a WAN, in accordance with aspects described herein.

FIG. 8 is a flow diagram of an example of a method for maintaining a vWAN for an enterprise client, in accordance with aspects described herein.

FIG. 10 is a cumulative distribution function (CDF) of a ratio of minimum latency of the geo-default point of presence (POP) to the fastest non-default PoP.

DETAILED DESCRIPTION

Figure 1:
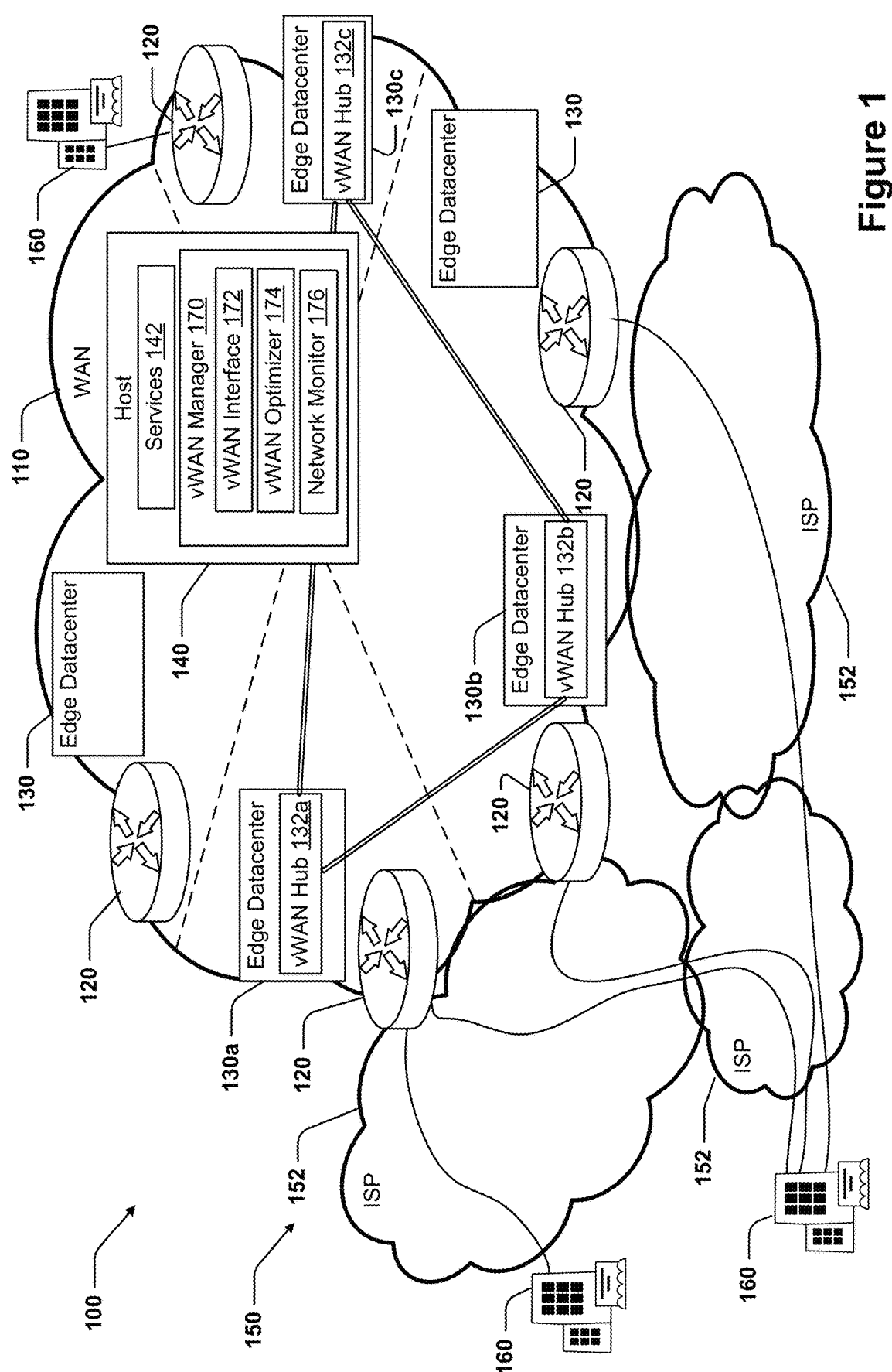
FIG. 1 is a diagram of an example of an architecture for a virtual wide area network (vWAN) implemented on an underlying wide area network (WAN), in accordance with aspects described herein.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well-known components are shown in block diagram form in order to avoid obscuring such concepts.

This disclosure describes various examples related to generating topologies for virtual wide area networks (vWANs). When an enterprise partners with a cloud service provider or WAN operator to deploy a vWAN, the enterprise may select locations where virtual hubs are to be instantiated. Network traffic for the vWAN may be routed from enterprise devices via an internet service provider (ISP) or other autonomous system (AS) to a virtual hub for further routing within the vWAN (e.g., to a network service or another enterprise device). Generally, enterprises may select locations that are geographically close to physical enterprise locations on the assumption that such locations will provide the lowest latency. The geographically closest location, however, does not always provide the lowest latency. Additionally, each virtual hub may be allocated resources for serving the traffic from the enterprise devices. For some enterprises, allocating a virtual hub at the geographically closest location for each branch office may lead to overprovisioning of virtual hubs, which may be inefficient in terms of resource usage and may translate into higher costs for the enterprise, the cloud service provider, or the WAN operator. For instance, a retail or food service enterprise may have numerous locations that utilize a relatively low number of connections to a virtual hub compared to a more traditional branch office with all employees of the enterprise located in a single building. In an aspect, the present disclosure provides systems and techniques for generating efficient and performant topologies for vWANs deployed on an underlying wide area network (WAN). The WAN operator or cloud network provider may generate an efficient and performant topology based on measured latency between metropolitan regions and geographically distributed entry points of the WAN. For example, the network topology may include a set of locations for virtual hubs. The locations may be selected to jointly optimize (e.g., minimize) for latency and the number of locations. In some implementations, the system may provide one or more network topologies on a Pareto optimal frontier of latency and the number of locations. The enterprise may select a desired topology based on a tradeoff between latency and number of locations (or cost). In some implementations, the enterprise may specify desired performance metrics for latency, and a single network topology that satisfies the desired performance metrics may be provided and/or implemented.

Turning now to FIGS. 1-12B, examples are depicted with reference to one or more components and one or more methods that may perform the actions or operations described herein, where components and/or actions/operations in dashed line may be optional. Although the operations described below in FIGS. 6-8 are presented in a particular order and/or as being performed by an example component, the ordering of the actions and the components performing the actions may be varied, in some examples, depending on the implementation. Moreover, in some examples, one or more of the actions, functions, and/or described components may be performed by a specially-programmed processor, a processor executing specially-programmed software or computer-readable media, or by any other combination of a hardware component and a software component capable of performing the described actions or functions.

FIG. 1 is a conceptual diagram 100 of an example of an architecture for a virtual wide area network (vWAN) implemented on an underlying wide area network (WAN) 110. The WAN 110 may include computing resources that are controlled by a network operator and accessible to enterprise clients at a branch office 160 via an Internet 150. For example, the WAN 110 may include a plurality of hosts 140 that host services 142. Each host 140 may be, for example, a virtual machine on a computing resource such as a server including memory and processors located in a datacenter. The WAN 110 may include entry points 120 such as edge routers that connect the hosts 140 to external networks such as internet service providers (ISPs) 152 or other ASes that form the Internet 150. In some implementations, an entry point 120 or edge router may be referred to as a point of presence (POP). A POP may refer to an entry point 120, which is a location where an edge router is directly connected (e.g., via a fiber optic cable) to routers of other networks. In an implementations, the WAN 110 may include edge datacenters 130 (e.g., edge datacenters 130a, 130b, and 130c) that include computing resources located adjacent to an edge router. For instance, an edge datacenter 130 may be directly connected (e.g., via a fiber optic cable) to a corresponding edge router at an entry point 120. The WAN 110 may host various services and may be referred to as a cloud network or cloud service provider.

Many enterprises (e.g., banks, retail companies) have a geo-distributed footprint with branch offices and stores across the world. These offices often connect to the same global database to keep track of customer accounts, sales, etc. Over time the bulk of the local infrastructure at enterprise branch offices has migrated to the cloud and enterprise clients have smaller footprints on premises to access cloud-hosted applications like databases, mail servers, etc. Moreover, enterprise clients at different branch offices communicate through audio/video applications and exchange local data with each other regularly. The two types of enterprise communication, between branch office and cloud services and inter-branch office may use the public Internet.

The public Internet is known to be less reliable and worse in performance than dedicated WANs operated by large cloud and Internet service providers. However, private WANs are billion-dollar assets consisting of thousands of units of optical and electrical equipment connected through optical fiber. Many enterprises lack the incentive and capital to connect their branch offices with a dedicated WAN. To bring the benefits of a dedicated WAN to enterprises, cloud companies offer virtual WANs. Virtual WANs are WAN-as-a-service offerings that allow enterprises to leverage the cloud WAN 110 as the interconnect between their branch offices 160.

A vWAN may be implemented as an overlay network on the WAN 110. Fundamentally, enterprise virtualized WANs are network overlays on the cloud that can provide fast connectivity between enterprise branch offices 160 and their cloud-hosted resources (e.g., mail, databases, proprietary enterprise software). For instance, FIG. 1 shows an example enterprise virtualized WAN that connects three branch offices 160 of an enterprise and its employees. In some implementations, the branch offices 160 may be located in different geographical regions (e.g., continents, countries, or states). The nodes of the virtual WAN overlay, called virtualized WAN hubs 132 (e.g., vWAN hubs 132a, 132b, 132c in FIG. 1), are network gate-ways in the cloud, providing regional points of connectivity into the cloud WAN. The hosts 140 may be implemented on the edge datacenters 130 along with the vWAN hubs 132, or in centralized datacenters.

The vWAN hubs 132 may be software gateways that run in cloud datacenters (e.g., edge datacenters 130. Traffic from enterprise branch offices 160 to cloud-hosted services 142 or inter-branch office traffic transits one or more vWAN hubs 132. To build their virtual WAN deployment, enterprises create vWAN hubs 132 by specifying the cloud region where the hub will be hosted, similar to how cloud customers can choose the region in which to spawn virtual machines. In reality, vWAN hubs reside in edge datacenters 130 in the specified region. Due to this, the vWAN manager 170 may allow enterprises to specify the metro of the edge datacenter 130 (e.g., NY) where a vWAN hub 132 is placed instead of the geographical region (e.g., cast-US).

There are limits on how many client connections a vWAN hub can sustain. Enterprises with large numbers of employees spawn proportionally larger virtual WANs with more hubs. The cost of the virtual WAN to the enterprise customer is a linear function of the number of vWAN hubs 132, the uptime of the vWAN hubs 132, and the volume of data transferred between the vWAN hubs 132.

By design, vWAN hubs 132 in the same virtual WAN deployment form a fully connected graph, e.g., via virtual connections with latency guarantees. Therefore, the number of vWAN hubs and their location in the cloud datacenters completely defines a virtual WAN's topology. For example, FIG. 1 shows a virtual WAN topology with three vWAN hubs 132a, 132b, and 132c.

In theory, virtualized WANs promise improved network latency to cloud-hosted services and between branch offices by using the cloud WAN 110 instead of the public Internet 150 as the network interconnect. However, these latency benefits depend on the topology of the virtual WAN, i.e., the number and locations of the vWAN hubs 132, spawned by the enterprise. Today, enterprises build their virtual WAN topologies by spawning vWAN hubs 132 in cloud datacenters nearest to their branch offices 160. As per this policy, the enterprise in FIG. 1 would place vWAN hub 132a in the datacenter 130a, vWAN hub 132b in the datacenter 130b, and so on. The intuition behind this strategy is that WAN hubs geographically closest to branch offices 160 are most likely to offer enterprise employees the lowest latency entry into the cloud WAN. However, these intuitive virtual WAN designs can perform poorly in practice since both complex inter-domain and cloud intra-domain phenomenon impact the latency of an enterprise virtual WAN.

Figure 2:
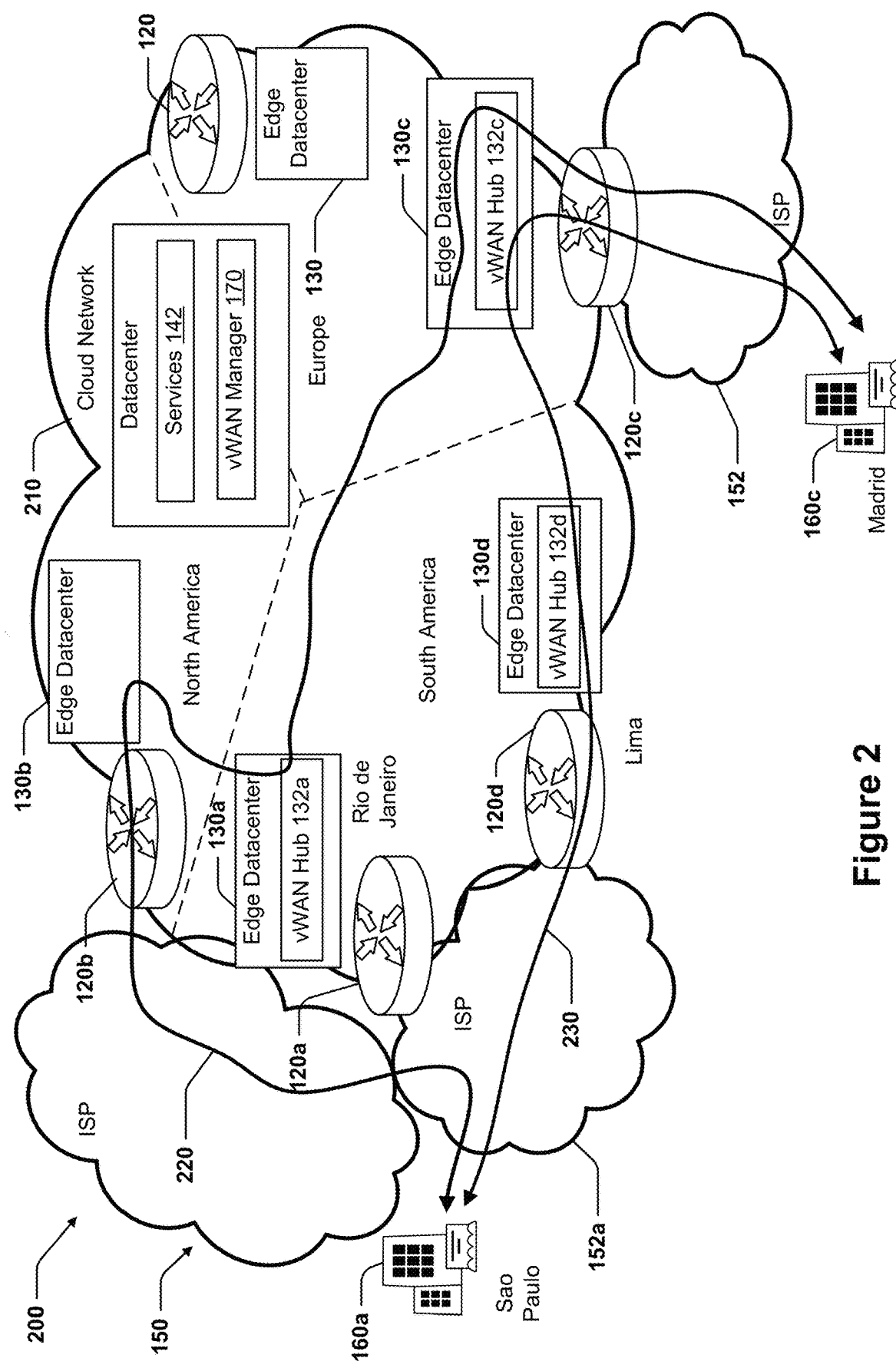
FIG. 2 is a diagram of an example of a vWAN with a problematic topology.

FIG. 2 is a diagram of an example of a vWAN 200 with a problematic topology based on observed behavior. The vWAN 200 observed significantly degraded performance from the virtual WAN of a large multi-continental enterprise due to inefficient hub placement in a commercial cloud network 210. The enterprise client spawned a vWAN hub 132a in a South American region of the cloud WAN 210, nearest to their branch office 160a in Sao Paulo. However, the upstream Internet Service Provider (ISP) 152a of the Sao Paulo branch office 160a routed the enterprise traffic to an entry point 120b in North America along path 220 instead of the entry point 120a in South America. This inter-domain routing decision inflated latency of enterprise clients since their traffic was routed from South America to the North American cloud region, only to be routed back to the vWAN hub 132a in South America before being on its way to the vWAN hub 132c and entry point 120c to reach the branch office 160c in Madrid.

An alternate placement of the vWAN hub 132a for the Sao Paulo branch office in the Lima datacenter 130d would have resolved this latency inflation since vWAN hubs in different datacenters 130 are hosted in separate IP prefixes. Therefore, while the upstream ISP 152a routes sub-optimally to the IP prefix of vWAN hub 132a via North America, the IP prefix of vWAN hub 132d is not affected by that routing decision. Accordingly, traffic for the vWAN hub 132 may be routed along the more direct path 230 including entry point 120d, which is adjacent the edge datacenter 130d.

Ideally, the enterprise customer can find a resolution for the inflated latency problem in FIG. 2 by filing an incident with the cloud provider. The cloud provider, in turn, can ask the upstream ISP 152a to modify their routing policy to prevent sub-optimal routing to the IP prefix of vWAN hub 132a. In fact, the enterprise customer in FIG. 2 pursued this action but it took several weeks for the problem to be resolved. The process of root-causing the latency inflation at the cloud provider, finding the faulty routing decision of the ISP 152a and negotiating with the ISP 152a to change their routing policy is a time consuming process that can span months. An alternate solution would be for the cloud provider to modify its own routing announcements towards the IP prefix of vWAN hub 132a to affect a policy change from ISPs 152 on the Internet. However, modifying announcements towards IP prefixes is a risky change since several cloud services are hosted in the same prefix. Modifying the announcements towards a prefix can adversely affect the traffic towards other cloud services in an unpredictable way. Virtual WAN clients can suffer inflated latencies either due to poor inter-domain routing decisions made by autonomous systems (ASes) on the Internet, like the upstream ISP 152a of the Sao Paulo branch office in FIG. 2, or due to poor intra-domain routing decisions in the cloud WAN. However, enterprise clients can rarely influence the routing choices made either by the ISP 152 or the cloud network 210 to improve their inflated latency in a timely manner.

Returning to FIG. 1, the operator of WAN 110 may provide a vWAN manager 170 that enables enterprise clients to independently deploy virtual WAN topologies that achieve the best performance possible, taking the inter-domain and intra-domain routing behavior as a given. For example, the vWAN manager 170 may be implemented as a service 142 executed on computing resources of a host 140. The vWAN manager 170 may include a vWAN interface 172 configured to communicate with an enterprise client, for example, to obtain inputs regarding locations of branch offices 160. For instance, the vWAN interface 172 may be configured to receive, from an enterprise client, a set of the metropolitan regions and a number of expected connections for each metropolitan region. The vWAN manager 170 may include a vWAN optimizer 174 configured to determine a vWAN topology such as the number and locations of the vWAN hubs 132. For example, the vWAN manager 170 may be configured to select a plurality of virtual WAN hub locations at selected edge datacenters of the plurality of edge datacenters. The vWAN manager 170 may include a network monitor 176 configured to obtain latency measurements from different metropolitan regions to the plurality of geographically distributed entry points of the WAN.

Designing performant virtual WAN topologies faces several technical problems. First, designing topologies that avoid inflated inter-domain latency may need a global view into the dynamic network performance from various client locations to the cloud WAN. Second, the cost of virtual WAN deployments scales linearly with the size of the topology. Naive virtual WAN designs can reduce the client latency by a brute-force placement of vWAN hubs 132 in all datacenters 130 of the cloud WAN. However, such deployments can be inefficient and/or prohibitively expensive for some enterprises. Finally, reliable data sources capturing the global view of dynamic latency measurements are needed to design the correct topologies. But such data sources are not widely available for use.

The vWAN manager 170 addresses these problems by leveraging active latency measurements from metropolitan regions (or metros) across the globe to different entry points 120, which may be called points of presence (POP), into a large commercial cloud WAN 110. The vWAN manager 170 formulates the virtual WAN design problem as an optimization with the goal of minimizing weighted connection latency from branch offices using the lowest cost virtual WAN topology with the fewest vWAN hubs 132. The vWAN manager 170 operates in two modes: cost-optimal and performance-optimal. In cost-optimal mode, the vWAN manager 170 minimizes the number of WAN hub locations for client branch offices and in performance-optimal mode, the vWAN manager 170 minimizes the weighted connection latency of enterprise clients. In the cost-optimal mode, the vWAN manager 170 designs virtual WAN topologies that use 28% fewer WAN hubs than the state-of-the-art techniques in use today. In performance-optimal mode, the vWAN manager 170 improves weighted latency of enterprise clients by 26%. In some implementations, the vWAN manager 170 balances the two goals of performance and cost efficiency by computing the Pareto frontier of optimal solutions. The vWAN manager 170 may propose virtual WAN designs at the Pareto frontier that improve weighted client latency by 22% at 25% lower cost than state-of-the-art.

Figure 3:
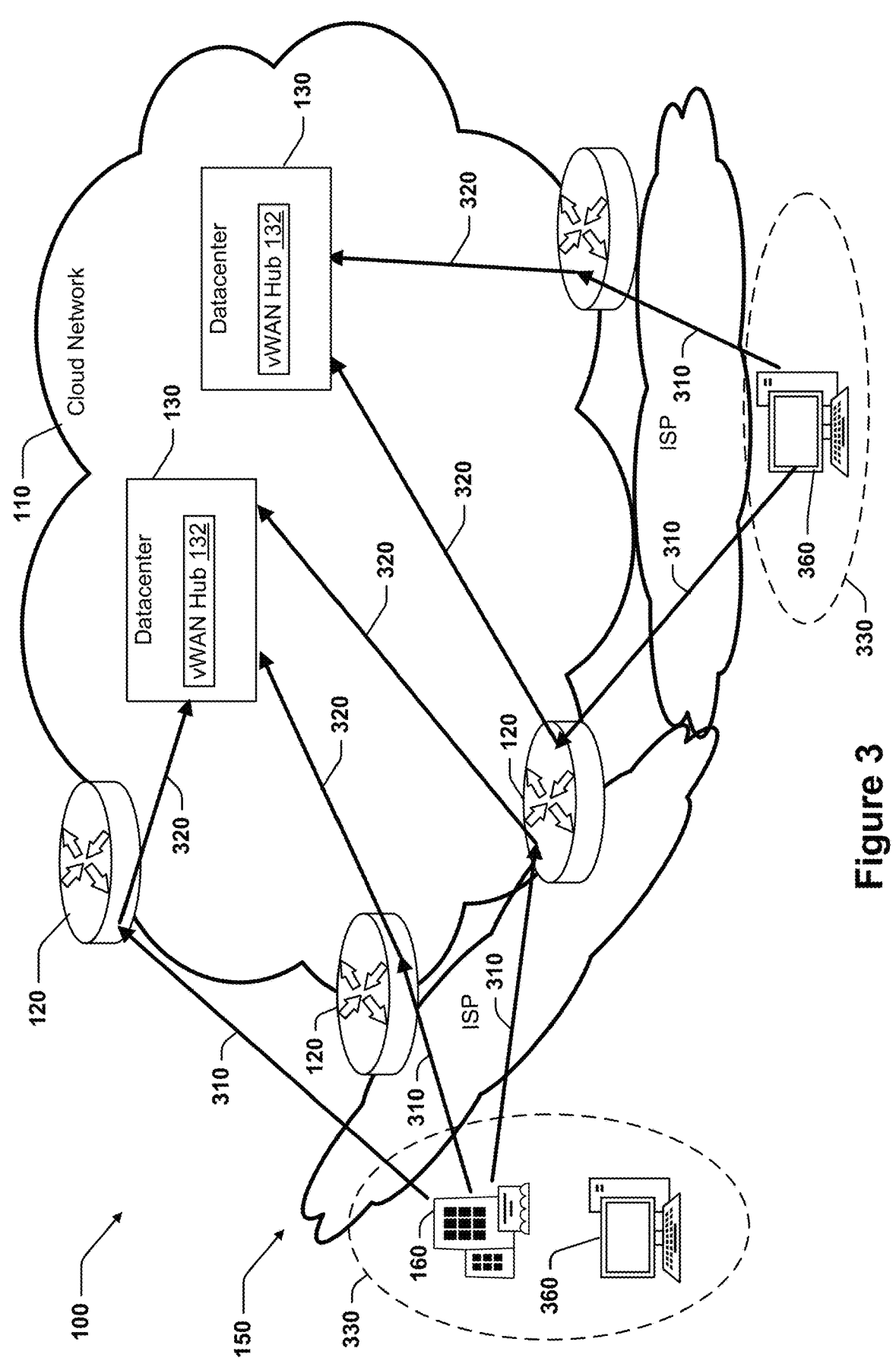
FIG. 3 is a diagram of an example of measurements of latency in a cloud network, in accordance with aspects described herein.

FIG. 3 is a diagram of an example of measurements of latency in a cloud network. Virtual WANs aim to enable lower latency access to cloud-managed services 142 and between enterprise branch offices 160 compared to the public Internet 150. Various factors impact the connection latency from enterprise clients to virtual WAN deployments. Like most cloud services, vWAN hubs 132 are hosted in IP address space owned by the cloud provider. For example, an IP prefix in the address space of the cloud provider hosts vWAN hubs located in New York datacenters 130. The IP space is not exclusively assigned to vWAN hubs 132 and may also host other cloud services. These prefixes are announced to the rest of the Internet by border gateway protocol (BGP)-speaking cloud edge routers at PoPs. The same set of prefixes are announced at multiple cloud PoPs and are said to be anycasted by the cloud network. ISPs 152 on the Internet 150 can select any path to reach an anycast prefix. BGP's best-path selection process on ISP routers guides the path selection to the prefixes. Anycast routing has been shown to perform well is most cases by drawing traffic to cloud PoPs nearest to the client. Overall, there are two components of virtual WAN connection latency: inter-domain latency and intra-domain latency.

Traffic from enterprise branch offices 160 in metropolitan regions 330 traverses the public Internet 150 until it reaches the cloud edge point of presence (e.g., entry point 120). This external portion 310 of the network path contributes to the inter-domain latency (L1) of virtual WAN connections. Latency from branch offices 160 to cloud PoPs relies on inter-domain phenomenon, i.e., the network path selected by the upstream ISP 152 of branch offices 160 and subsequent routing decisions made by other ISPs 152 on the Internet 150. Once the virtual WAN traffic reaches the cloud edge, the traffic is routed to the datacenter 130 hosting the vWAN hub 132. This internal portion 320 of the network path contributes to the intra-domain latency (L2) of virtual WAN connections. Latency from cloud PoPs to datacenters relies on intra-domain routing decisions made by the cloud network.

Measurements of a large commercial cloud provider indicate that inter-domain latency is over 80% of the connection latency. The latency was measured from hundreds of client locations to the edge PoPs of the WAN 110. The inter-domain latency L1 was computed as the median latency over hundreds of latency measurements in a day from client locations to cloud edge PoPs. On the same day as the latency measurements to the cloud edge, the L2 latency was measured as ping latencies from cloud edges to all datacenter gateway routers in the cloud. These two sets of measurements show that the latency to reach the cloud edge (on portion 310) from a client location is 80% of the overall latency from the client location to the edge and subsequently to the nearest datacenter in more than 75% of the cases. In other words, $$\frac{L_1}{L_1 + L_2}$$

is ≥80%. Thus, the vWAN manager 170 may focus on the inter-domain portion 310 of enterprise client latency to improve the performance of virtual WANs. Traffic between branch offices 160 additionally traverses inter-datacenter links in the cloud. However, this portion of virtual WAN connection latency is minimal due to software defined network (SDN)-based performance-optimal routing implemented by cloud providers for intra-domain traffic.

Figure 4:
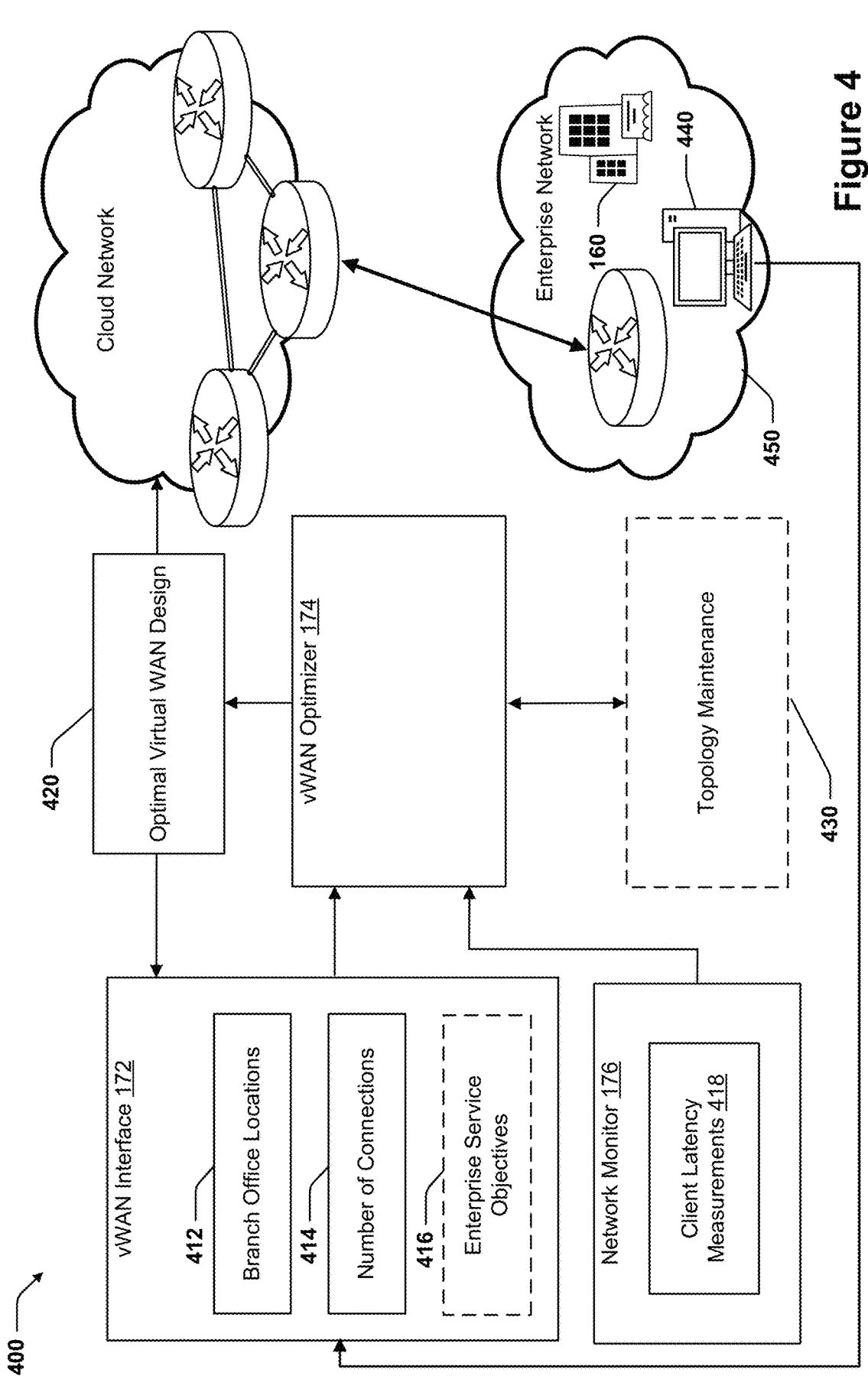
FIG. 4 is a data flow diagram illustrating generation of a vWAN topology, in accordance with aspects described herein.

FIG. 4 is a data flow diagram 400 illustrating generation of a vWAN topology by the vWAN manager 170. The vWAN manager 170 designs performance-optimal and cost-optimal virtual WAN deployments for enterprises. An enterprise may have an enterprise network 450 for a branch office

11

160. An enterprise client 440 may be an administrator of the enterprise network 450. The enterprise client 440 provides the geographical footprint of their branch offices 160 and employees to the vWAN manager 170 as input via the vWAN interface 172. The vWAN manager 170 leverages a streaming pipeline of client latency measurements 418 from the network monitor 176 to profile the performance of connections to all cloud PoPs from client metros i.e., the inter-domain portion 310 of virtual WAN connections. The vWAN optimizer 174 receives the enterprise input from the vWAN interface 172 and the latency measurements 418 from the network monitor 176. The vWAN optimizer 174 outputs an optimal virtual WAN design 420, which may include the locations (e.g., datacenters 130) of the vWAN hubs 132 and the number of vWAN hubs at each location. The vWAN manager 170 can be deployed as a built-in tool by a cloud provider with WAN-as-a-service offerings. In such cases, the vWAN manager 170 can suggest hub deployments to enterprises in a similar way as cloud provider online portals suggest virtual machine sizes to customers. For example, the vWAN manager 170 may output the suggested network topology via the vWAN interface 172. In some implementations the vWAN manager 170 may perform topology maintenance 430 to determine whether to update the optimal virtual WAN design 420 (e.g., due to changes in the client latency measurements 418.

The vWAN interface 172 seeks two inputs from enterprise clients: (1) the location of enterprise branch offices, and (2) the maximum number of client connections from each branch office. In an implementation, the vWAN interface 172 provides a user interface for an enterprise (e.g., a system administrator) to provide the branch office locations 412 and the number of connections 414. For instance, an enterprise can use vWAN interface 172 to specify that it has three branch offices, e.g., Sao Paulo, Miami, and Madrid. The enterprise can use vWAN interface 172 to specify that each branch office has 500-people teams using the virtual WAN. In some implementations, the enterprise can use vWAN interface 172 to specify enterprise service objectives 416. For example, the enterprise service objectives 416 may include a target latency for each branch office.

The vWAN manager 170 utilizes latency measurements obtained via the network monitor 176. The network monitor 176 collects a pipeline of latency measurements performed from client endpoints such as branch offices 160 or clients 360) towards different cloud WAN PoPs. PoPs are entry points 120 into the cloud WAN. The network monitor 176 aggregates the measurements to the granularity of client metropolitan region 330 as sources and cloud points of presence as destinations. For example, the network monitor 176 may analyze hundreds of millions of measurements per month to cloud PoPs, spanning hundreds of client metropolitan regions 330, each with thousands of latency measurements towards the WAN 110 on any given day. In some implementations, to make the dataset manageable and uniform, the network monitor 176 aggregates the samples to the median, 90th percentile and 95th percentile latency in each ten minute time window between a pair of a metropolitan region 330 and an entry point 120. For example, one row in the dataset may contain: client metropolitan region 330 and network, timestamp, cloud POP (e.g., entry point 120), median, 90th percentile, and 95th percentile latencies in a ten minute window.

This dataset is representative of real client latencies to cloud PoPs for two reasons. First, these latency measurements are gathered from the transfer of a small file from the cloud PoP to the client location. Data-transfer based measurements better estimate the latency of client to cloud communication than mechanisms like ping and traceroute that use Internet control message protocol (ICMP) packets. ICMP traffic is often treated differently from data packets by routers on the path. Second, the set of clients performing these measurements are already accessing services in the WAN 110, making the measurement client-metro set an accurate reflection of the actual clients of the cloud. Due to the large volume of measurements and aggregation of samples into quantiles, the latency measurements are less noisy.

The latency measurements from clients 360 in the dataset may be organic i.e., a measurement occurs when clients 360 of the commercial cloud provider access a popular cloud-hosted website hosted at a datacenter in the WAN 110. The measurements for a client 360 in a metro region 330 are relevant for a branch office 160 in the metro region even if the client 360 is not associated with an enterprise client. The measurement infrastructure records the metropolitan region 330 of the client 360 while using client-side code to measure to anycasted cloud edge PoPs. As a result, the measurements do not occur uniformly across time or metropolitan regions 330. In any time window, numerous measurements may have occurred from some metros while only a handful of measurements may have been recorded for other metros. The measurement methodology relies on anycast routes to cloud PoPs, similar to real-world customer traffic. As a result, latency measurements from a client metro region 330 are directed towards a small set of cloud edge PoPs-decided by anycast routing on the Internet. This means that the dataset does not have a full cross-product of measurements from all client metros to all cloud PoPs. This dataset captures latency measurements to different cloud PoPs from every client location. This includes the POP chosen by anycast routing as well as a few alternates.

Anycast routing from a client steers the traffic to a POP referred to as the anycast-default PoP. The measurements to alternate PoPs in the dataset are enabled using special configuration at the cloud edge router at the POP or entry point 120. However, the measurements do not record which PoP is the anycast-default. To identify the anycast-default POP for a client metro region 330, the network monitor 176 measures the frequency of measurements towards all PoPs from a given metro region 330. For most metro regions 330, one POP receives significantly more measurements, indicating that PoP is used more. The POP with the greatest number of measurements for the chosen client location is the anycast-default PoP. According to some estimates, for about 90% of client prefixes, anycast connects to the geographically closest PoP. The geographically closest entry point 120 for all client metro regions 330 can be determined using coordinates of cloud PoPs in the dataset. The geographically closest POP may be referred to as the geo-default PoP.

Using the input from vWAN interface 172 and the network monitor 176, the vWAN optimizer 174 builds a performance and cost optimal virtual WAN topology for the enterprise. The output from the vWAN optimizer 174 includes the number and datacenter locations of vWAN hubs 132 in the suggested topology. Since all vWAN hubs 132 in a topology are fully-connected, the number and locations fully specify a virtual WAN topology.

The primary objective of the vWAN optimizer 174 is to place WAN hubs into topologies that minimize the latency across client connections. A second objective of the vWAN optimizer 174 is to use the fewest number of vWAN hubs required to minimize the latency, in turn reducing the cost of the virtual WAN deployment. Enterprises can configure the vWAN optimizer 174 to operate in two modes: performance-optimal, and cost-optimal. The performance-optimal mode minimizes the weighted latency of the overall WAN topology with no upper bound on the cost. The cost-optimal mode reduces the weighted latency using a virtual WAN deployment of near-minimal cost. Both modes produce hub placements based on the optimization goal(s). Alternatively, an enterprise can explore the cost/performance Pareto frontier and choose how to trade off the two objectives. Because vWAN hubs 132 are hosted in datacenters 130, it is sufficient for the vWAN manager 170 to design virtual WANs by minimizing the connection latency to the cloud edge PoP, instead of the datacenter The optimization algorithm of the vWAN manager 170 uses the global latency measurements 418 from different client locations to cloud edge PoPs. Equipped with the enterprise inputs and latency measurements 418 from the cloud provider, the vWAN optimizer 174 formalizes the problem of optimal WAN hub placement. In some implementations, the vWAN optimizer 174 formulates the problem as a mixed integer linear program (MILP). The decision variables of the optimization decide how many and which cloud PoPs should be selected for placing WAN hubs for one or more enterprise branch offices. In an implementation, the MILP can be implemented in Python 3 using the embedded convex optimization language (CVXPY). CVXPY solves a MILP efficiently by choosing its default solver suitable for the problem objective. For the formulated topologies discussed herein, the optimization takes at most about 19 seconds to execute.

The vWAN optimizer 174 may treat the virtual WAN design problem as an optimization. The vWAN optimizer 174 optimization algorithm takes three types of inputs: (1) inputs from the cloud platform that offers to host virtual WANs (2) inputs from live measurements of connection latency from clients to the cloud and (3) inputs from the enterprise designing their virtual WAN deployment. Table 1 summarizes an example algorithm of the vWAN optimizer 174

TABLE 1

| Algorithm 1 for virtual WAN design |
| --- |

| Inputs: | |
| --- | --- |
| P: | set of cloud PoPs, \|P\| = p |
| β: | maximum connections per virtual WAN hub |
| $L_{ij}$: | measured connection latency from metro j to PoP i |
| M: | set of client metros or branch office locations, \|M\| = m |
| $C_j$: | maximum connections from branch office in metro j |
| K: | upper bound on number of unique PoPs in topology |

| Outputs: | |
| --- | --- |
| $u_i$: | indicator variable; 1 a hub is placed in PoP i |
| $U_{ji}$: | indicator variable; 1 if PoP i selected for metro j |
| $K_{min}$: | minimum possible unique PoPs with feasible solution |
| $k_{max}$: | maximum possible unique PoPs with feasible solution |

$$\text{Minimize:} \sum_{j=1}^{m} C_j \cdot \sum_{i=1}^{p} U_{ij} \cdot L_{ij}$$

subject to:

$$(1) \quad u_i \in \{0, 1\} \qquad \forall\, i \in P$$

$$(2) \quad U_{ji} \in \{0, 1\} \qquad \forall\, j \in M, i \in P$$

$$(3) \quad \sum_{i=1}^{p} U_{ji} = 1 \qquad \forall\, j \in M$$

TABLE 1-continued

| Algorithm 1 for virtual WAN design |
| --- |

$$(4) \quad u_i - \sum_{j=1}^{m} U_{ji} \geq 0 \quad \forall\, i \in P$$

$$(5) \quad \sum_{i=1}^{p} u_i \leq K$$

P is the set of cloud PoPs adjacent to datacenters 130 that can host vWAN hubs 132. There is a constant limit on the number of simultaneous connections to a virtual WAN hub in cloud networks regardless of hub location. This per-hub connection limit may be represented as β. For example, β may be set to 1000 in some implementations.

The vWAN manager 170 needs an aggregate measure of latency between branch offices to cloud edge PoPs. The latency from metro j to cloud POP i is represented as $L_{ij}$. As discussed above, the dataset from the network monitor 176 may include periodic latency measurements from client metropolitan locations to cloud PoPs. Since latency changes over time, the network monitor 176 aggregates the latency between a pair of a metro and a PoP to a percentile (e.g., median) of the latency distribution. In some implementations, the enterprise service objectives 416 (e.g., desired latency) input by the enterprise customer dictates which percentile of the latency distribution is input to the vWAN optimizer 174. A full cross-product of latency between client metros and cloud PoPs is not needed for the vWAN optimizer 174 because some cloud PoPs are intuitively too distant from a client metro to be in consideration e.g., latency measurements from clients in Los Angeles to a POP in Singapore is not needed because many other cloud PoPs are significantly closer to Los Angeles than the one in Singapore.

The optimization algorithm takes the location of enterprise branch offices at the granularity of a metropolitan location. M is the set of all branch office locations. The enterprise customer also provides the number of expected connections from each branch office, represented by the vector C of size m. The vWAN optimizer 174 assumes that one branch office connects to one virtual WAN hub (i.e., it does not split traffic across multiple hubs).

The parameters u and U are decision variables to count the number of unique PoPs selected by vWAN optimizer 174 for placing hubs. The indicator output variable $u_i$ is 1 if the vWAN optimizer 174 decides to place a WAN hub in PoP i. To ensure that only one PoP is selected to place a hub for a client metro location, another indicator decision variable, U is set to 1 if the hub for metro j is placed in PoP i. Both $u_i$ and $U_{ji}$ are indicator variables and can only take the values 1 or 0 as indicated in the first two constraints: $u_i \in \{0,1\}$ and $U_{ji} \in \{0,1\}$.

Further, the vWAN optimizer 174 ensures that connections from one client metro go to only one hub placed in a POP with the third constraint: $\sum_{i=1}^{P} U_{ji} = 1$, $\forall j \in M$. the vWAN optimizer 174 ensures that only one PoP is selected to place the hub for one client metro location with the fourth constraint: $u_i - \sum_{j=1}^{m} U_{ji} \geq 0$.

In an implementation, the vWAN optimizer 174 designs virtual WAN topologies within K PoPs. The vWAN optimizer 174 searches for the smallest value of K for which the optimization can find a feasible solution. In some implementations, the vWAN optimizer 174 backtracks from K in steps of 1 to determine other optimal network topologies with smaller numbers of unique PoPs. The multiple optimal network topologies provide the cost vs. performance Pareto frontier. A fifth constraint ensures that total number of unique PoPs selected for placing WAN hubs should not exceed the threshold K: $\Sigma_{i=1}^{P} u_i \leq K$. The fifth constraint may only be enforced for cost-optimal mode. The value of K may be set so that the optimization achieves the objective with a minimum number of PoPs. This is important in reducing the number of hubs as metros with the same PoPs can be merged, aggregating the total connections. To compute the number of hubs, the vWAN optimizer 174 sums the connections to each POP across all metros that chose the POP and divides those sums by $\beta$ to get the total number of hubs required at each PoP. Adding the number of hubs at each POP yields the total number of required hubs for the topology.

The vWAN optimizer 174 minimizes the sum of latencies from each branch office 160 to the PoP it is mapped to, weighted by the number of connections 414 from that branch office 160. The optimization finds PoPs ($u_i$) that minimize the weighted latency while ensuring that all the constraints are met. Moreover, for cost-optimal mode the vWAN optimizer 174 may re-run the algorithm for different values of K, to find the least possible K that gives a feasible solution. This outputs $k_{min}$.

The vWAN optimizer 174 runs in two modes, l_optimal, and k_optimal. l_optimal is the performance-optimal mode, and ignores the fifth constraint. Hence, optimizing only for weighted latency. This mode outputs the maximum hubs possible with feasible solutions, i.e., $k_{max}$. Adding more hubs after $k_{max}$ either gives an infeasible solution or does not improve the latency any further. k_optimal is the cost-optimal mode, and minimizes the weighted latency with the fewest number of PoPs possible and outputs $k_{min}$. Together these modes give $k_{max}$ and $k_{min}$ which are the two extreme ends of the Pareto frontier for cost.

In some implementations, the vWAN optimizer 174 explores all possible solutions on the cost vs. performance Pareto frontier by solving the objective function at each possible value of K between $k_{min}$ and $k_{max}$. These solutions on the Pareto frontier are virtual WAN topologies with minimum weighted latency at all possible K values. In some implementations, a balance between cost and performance may be achieved by selecting an average value of k between $k_{min}$ and $k_{max}$. The topology generated by the vWAN optimizer 174 with the average value of k may be referred to as mean_k. This heuristic can optimize performance with a high probability without incurring much cost, which is helpful for customers wanting both low cost and low latency.

Algorithm 1 designs virtual WAN topologies at the granularity of PoPs and not hubs. The vWAN optimizer 174 may calculate the total number of hubs from the optimization output in a post-processing step. WAN hubs in the same POP from multiple metros are merged into one set of hubs large enough to handle the connections from all metros served by the hub. The vWAN optimizer 174 calculates the total number of connections to a POP divided by $\beta$ as the total hubs required for a hub location.

The least value of K would be 1 if vWAN optimizer 174 had access to latency measurements between the full cross-product of PoPs and metros. That is, the vWAN optimizer 174 could pick the single POP that would have the lowest weighted latency. However, the vWAN optimizer 174 is limited by the availability of global latency measurements by the dynamics of anycast on the Internet. Anycast-based latency measurements may not cover all the possible POP and metro pairs. This limits the possible minimum K values that can give a feasible solution to the optimization. Finally, while the post-processing step for allocating vWAN hubs 132 based on PoPs is near-optimal, it may not be optimal in terms of cost in cases where metros with fractional use of a vWAN hub will add an extra vWAN hub nearby rather than share a vWAN hub further away.

In some implementations, the vWAN optimizer 174 may operate in a service level objective (SLO) mode that keeps latency within some threshold. There can be enterprise clients who may desire that the latency they get to their branch offices remain below a certain threshold (e.g., A cap of 100 ms for all metros or well-connected metros with 50 ms and poorly connected ones with a 200 ms cap). the vWAN optimizer 174 can be extended to include this requirement.

To achieve this, the vWAN optimizer 174 needs the latency requirement input as an enterprise service objective 416 from the customer, which can be represented as the input variable, $\alpha_j$, i.e., desired latency for connections to metro j. The vWAN optimizer 174 can be configured with a new demand constraint: $\Sigma_{i=1}^{P} U_{ji} \cdot L_{ij} \leq a_j, \forall j \in m$. This constraint ensures that any metro/POP combination chosen by the algorithm (where $U_{ji}=1$) will have latency below $\alpha_j$. The objective function minimizes the latency with this additional constraint. This mode to solve the optimization with these changes may be referred to as slo_optimal. slo_optimal optimizes both, latency and hub counts while meeting the latency cap per metro.

In some implementations, the vWAN maintenance component 178 is configured to maintain a network topology over time as network conditions change. The vWAN maintenance component 178 may re-run the vWAN optimizer 174 to determine a new optimal placement. The vWAN maintenance component 178 may then add new hubs or migrate existing hubs to new locations. The benefit of maintenance is keeping latency low and using fewer hubs, but this comes at the cost of shutting down existing hubs and migrating connections. Furthermore, there is the risk of creating a new hub placement based on transient conditions that does not yield any improvement.

The vWAN maintenance component 178 may use an exponentially weighted moving average to balance historical data against new data. A weighting factor ($\gamma$) may be set to values from 1 (no historical data) to 0.1 (slow moving, mostly historical data). Historical data may be divided into non-overlapping 1-day windows. To use smoothed data for optimization, the vWAN maintenance component 178 may calculate the input $L_{ij,w}$ (latency from metro j to PoP i in time window w) as:

$$L_{ij,w} = \gamma \cdot \alpha_{ij,w} + (1 - \gamma) \cdot \alpha_{ij,w-1} \tag{7}$$

The amount of smoothing indicated by the weighting factor ($\gamma$) may impact latency, number of PoPs, and number of changes to POP selection depending on the optimization mode e.g., l_optimal, k_optimal, and mean_k. Different amounts of smoothing were tested with optimization on y values of 1 (no averaging), 0.9 (fast moving average), 0.5 (medium moving average) and 0.1 (slow moving average) over 1-day windows for all three policies by selecting all measurements for each window and calculating the $90^{th}$ percentile latency for metro j in connecting to PoP i in time window w as $\alpha_{ij,w}$.

For latency with l_optimal, smoothing is necessary, but a fast-moving average with little historical data yields the lowest average latency. The results without averaging ($\gamma=1$) perform poorly because the system over-reacts to temporary network conditions. While more smoothing (slow-moving averages) do improve performance from the baseline topology (day 1), a fast moving average performs best, as it is able to respond to short-lived network conditions, such as temporary increases in latency, without overreacting. For k_optimal, using no smoothing performs best, and performance also increases with additional history, while mean_k follows the pattern of l_optimal.

Turning to the cost (number of PoPs), for l_optimal, a fast-moving average generally works best, while k_optimal requires smoothing but is insensitive to the amount as smoothing is only over latency. The reason that more PoPs are used with smoothing is that the set of PoPs with measurements from a metro may change every day; with smoothing measurements from previous days can be used to make selections, while without smoothing only the currently measured PoPs can be used. Thus, with smoothing more PoPs can be considered, which leads to more PoPs being selected. The mean_k policy requires smoothing, but is fairly insensitive to how much. This greatly expands the options for hub placement, leading to smaller topologies. For similar reasons that l_optimal saw an increased number of PoPs, the mean_k policy saw a decrease: with more PoPs available through smoothing, which can create a more efficient topology. The amount of smoothing does not affect the PoPs available, so it is insensitive to $\gamma$. The mean_k policy builds on the other two policies, and hence shows the same indifference to $\gamma$.

Looking finally at how many metros switch between PoPs during each window l_optimal has the fewest switches, and that the number of switches decreases with smoothing (lower $\gamma$), as a slower moving average delays the effect of changing network conditions. The k_optimal and mean_k policies show more frequent switches. With a small number of PoPs, metros are less likely to use a stable, fast PoP and more likely to connect to a more distant hub with varying behavior, leading to more changes in topology.

Adapting topologies to changing network conditions can provide large benefits both in latency and number of PoPs, at the cost of maintenance operations to move clients between hubs. The amount of smoothing needed depends heavily on the policy goal; for latency, a fast-moving average works best to allow rapid reaction to changes in network conditions without overreacting. For number of PoPs, smoothing is necessary to reach more PoPs, but the amount matters little.

Figure 5:
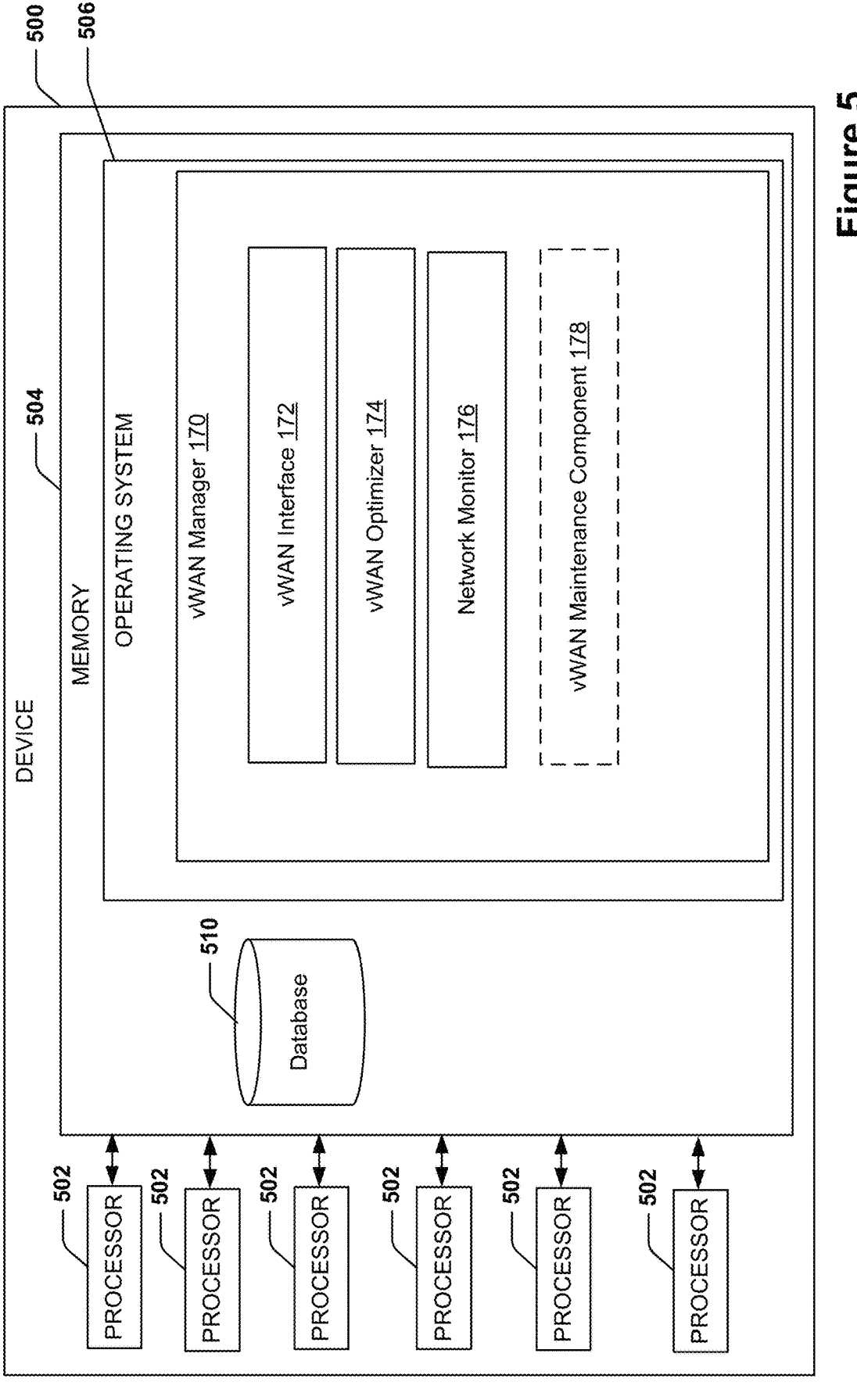
FIG. 5 is a schematic diagram of an example of a device for generating a vWAN topology, in accordance with aspects described herein.
Figure 6:
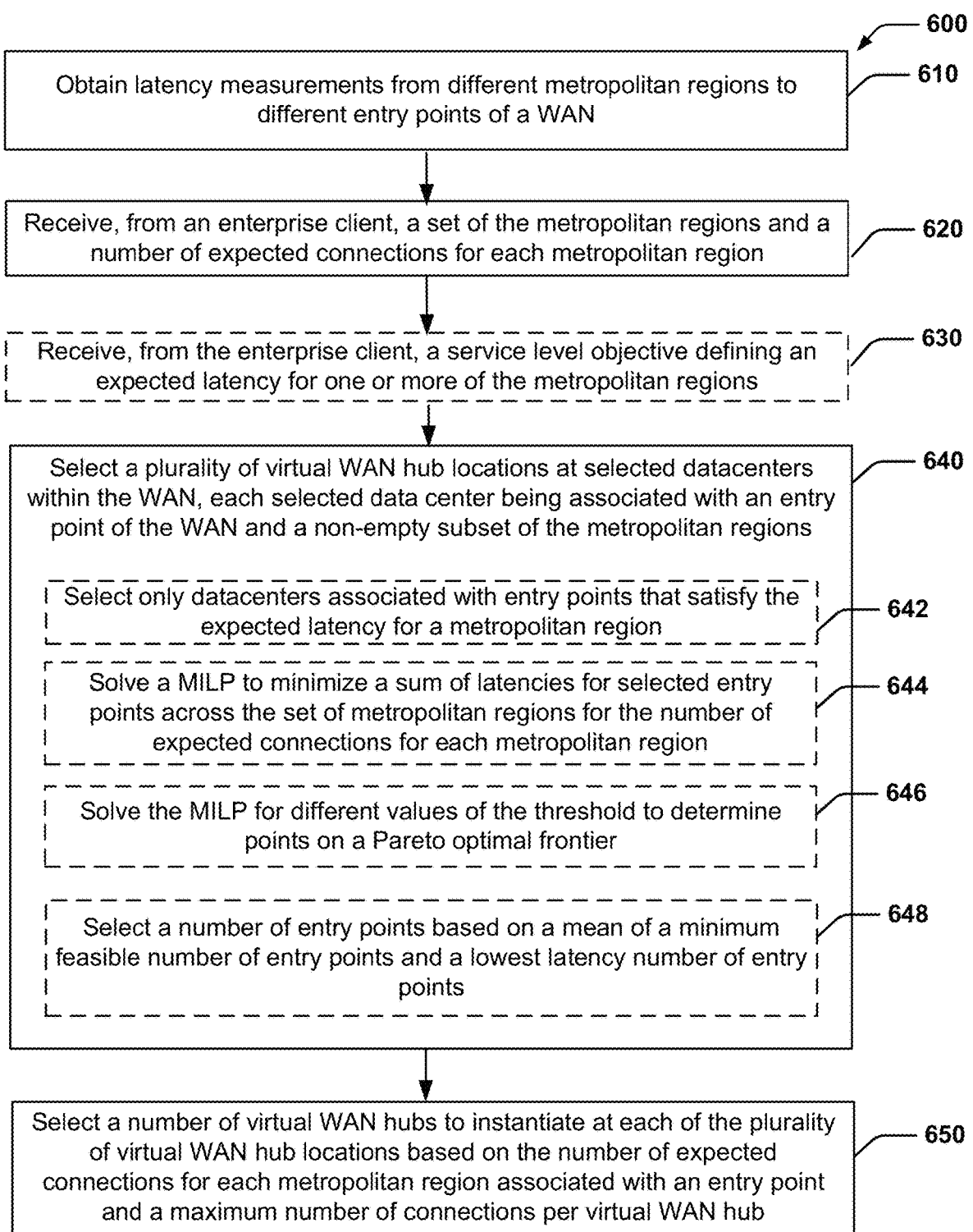
FIG. 6 is a flow diagram of an example method of generating a vWAN topology, in accordance with aspects described herein.

FIG. 5 is a schematic diagram of an example of an apparatus 500 (e.g., a computing device) for managing virtual WAN deployments. The apparatus 500 may be implemented as one or more computing devices in the WAN 110.

In an example, the apparatus 500 includes at least one processor 502 and a memory 504 configured to execute or store instructions or other parameters related to providing an operating system 506, which can execute one or more applications or processes, such as, but not limited to, the vWAN manager 170. For example, processor 502 and memory 504 may be separate components communicatively coupled by a bus (e.g., on a motherboard or other portion of a computing device, on an integrated circuit, such as a system on a chip (SoC), etc.), components integrated within one another (e.g., processor 502 can include the memory 504 as an on-board component), and/or the like. Memory 504 may store instructions, parameters, data structures, etc. for use/execution by processor 502 to perform functions described herein. In some implementations, the apparatus 500 is implemented as a distributed processing system, for example, with multiple processors 502 and memories 504 distributed across physical systems such as servers or datacenters.

In an example, the vWAN manager 170 includes the vWAN interface 172, the vWAN optimizer 174, and the network monitor 176. In some implementations, each of the vWAN interface 172, the vWAN optimizer 174, and the network monitor 176 are implemented in a distributed manner on different resources of the WAN 110 (e.g., as services or microservices that communicate via an application programming interface). In some implementations, the memory 504 includes a database 510 that stores the measurements 418 of the network monitor 176.

FIG. 6 is a flow diagram of an example of a method 600 for managing a virtual WAN topology on an underlying WAN. For example, the method 600 can be performed by the vWAN manager 170, the apparatus 500 and/or one or more components thereof to manage a vWAN deployed on the WAN 110.

At block 610, the method 600 includes obtaining latency measurements from different metropolitan regions to different entry points of a WAN. In an example, the network monitor 176, e.g., in conjunction with processor 502, memory 504, and operating system 506, can obtain latency measurements 418 from different metropolitan regions 330 to different entry points 120 of the WAN 110.

At block 620, the method 600 includes receiving, from an enterprise client, a set of the metropolitan regions and a number of expected connections for each metropolitan region. In an example, the vWAN interface 172, e.g., in conjunction with processor 502, memory 504, and operating system 506, can receive, from the enterprise client 440, a set of the metropolitan regions (e.g., branch office locations 412) and a number of expected connections 414 for each metropolitan region.

At block 630, the method 600 optionally includes receiving, from the enterprise client, a service level objective defining an expected latency for one or more of the metropolitan regions. In an example, the vWAN interface 172, e.g., in conjunction with processor 502, memory 504, and operating system 506, can receive, from the enterprise client 440, a service level objective 416 defining an expected latency for one or more of the metropolitan regions.

At block 640, the method 600 includes selecting a plurality of virtual WAN hub locations at selected datacenters within the WAN, each selected datacenter being associated with an entry point of the WAN and a non-empty subset of the metropolitan regions. In an example, the vWAN optimizer 174, e.g., in conjunction with processor 502, memory 504, and operating system 506, can select a plurality of virtual WAN hub locations at selected datacenters 130 within the WAN, each selected datacenter 130 being associated with an entry point 120 of the WAN 110 and a non-empty subset of the metropolitan regions 330. In some implementations (e.g., where block 630 is performed), at sub-block 642, the block 640 may optionally include selecting only datacenters associated with entry points that satisfy the expected latency for a metropolitan region. In some implementations, at sub-block 644, the block 640 may optionally include solving a MILP to minimize a sum of latencies for selected entry points across the set of metropolitan regions for the number of expected connections for each metropolitan region. In some implementations, at sub-block 646, the block 640 may optionally include solving the MILP for different values of the threshold to determine points on a Pareto optimal frontier. In some implementations, at sub-block 648, the block 640 may optionally include selecting a number of entry points based on a mean of a minimum feasible number of entry points and a lowest latency number of entry points.

At block 650, the method 600 optionally includes selecting a number of virtual WAN hubs to instantiate at each of the plurality of virtual WAN hub locations based on the number of expected connections for each metropolitan region associated with an entry point and a maximum number of connections per virtual WAN hub. In an example, the vWAN optimizer 174, e.g., in conjunction with processor 502, memory 504, and operating system 506, can select the number of vWAN hubs 132 to instantiate at each of the plurality of virtual WAN hub locations (e.g., datacenters 130) based on the number of expected connections (414) for each metropolitan region 330 associated with an entry point 120 and a maximum number of connections per virtual WAN hub (B).

FIG. 7 is a flow diagram of an example of a method 700 for measuring latency from clients in metro regions to entry points of a WAN. For example, the method 700 can be performed by the network monitor 176, the apparatus 500 and/or one or more components thereof to obtain latency measurements 418. The method 700 may be an example of the block 610.

At block 710, the method 700 includes measuring, for each of a plurality of clients, a latency from a respective client to an entry point of the WAN for a service within the WAN. In an example, the network monitor 176 can measure the latency for the portion 310 from a respective client (e.g., office 160 or client 360) to the entry point 120 of the WAN 110 for a service 142 within the WAN 110.

At block 720, the method 700 includes determining a metropolitan region of the respective client and the entry point for each latency measurement. In an example, the network monitor 176 can determine a metropolitan region 330 of the respective client (e.g., office 160 or client 360) and the entry point 120 for each latency measurement.

At block 730, the method 700 includes aggregating the latency measurements for clients within metropolitan regions for each entry point having a threshold number of latency measurements to determine the latency measurement between a metropolitan region and an entry point. In an example, the network monitor 176 can aggregate the latency measurements for clients within metropolitan regions 330 for each entry point 120 having a threshold number of latency measurements to determine the latency measurement between a metropolitan region 330 and an entry point 120.

FIG. 8 is a flow diagram of an example of a method 800 for maintaining a vWAN for an enterprise client. For example, the method 800 can be performed by the vWAN maintenance component 178, the apparatus 500 and/or one or more components thereof to maintain a vWAN. The method 800 may be performed after the method 600 on a vWAN topology resulting from the method 600.

At block 810, the method 800 includes evaluating an average latency over a plurality of time windows using an exponentially weighted moving average. In an example, the maintenance component 178 and/or the network monitor 176 can evaluate the average latency over a plurality of time windows using an exponentially weighted moving average. For example, the average latency may be based on the latency measurements 418 during each of the time windows.

At block 820, the method 800 includes reselecting the plurality of virtual WAN hub locations based on the average latency. In an example, the vWAN maintenance component 178 and/or the vWAN optimizer 174 can reselect the plurality of virtual WAN hub locations based on the average latency. For instance, reselecting may include executing the block 640 to optimize the average latency of the selected virtual WAN hub locations.

At block 830, the method 800 includes migrating one or more virtual WAN hubs to a datacenter associated with a newly selected entry point from a datacenter associated with an entry point that is no longer selected. In an example, the vWAN maintenance component 178 can migrate one or more vWAN hubs 132 to a datacenter 130 associated with a newly selected entry point 120 from a datacenter 130 associated with an entry point 120 that is no longer selected.

Figure 9:
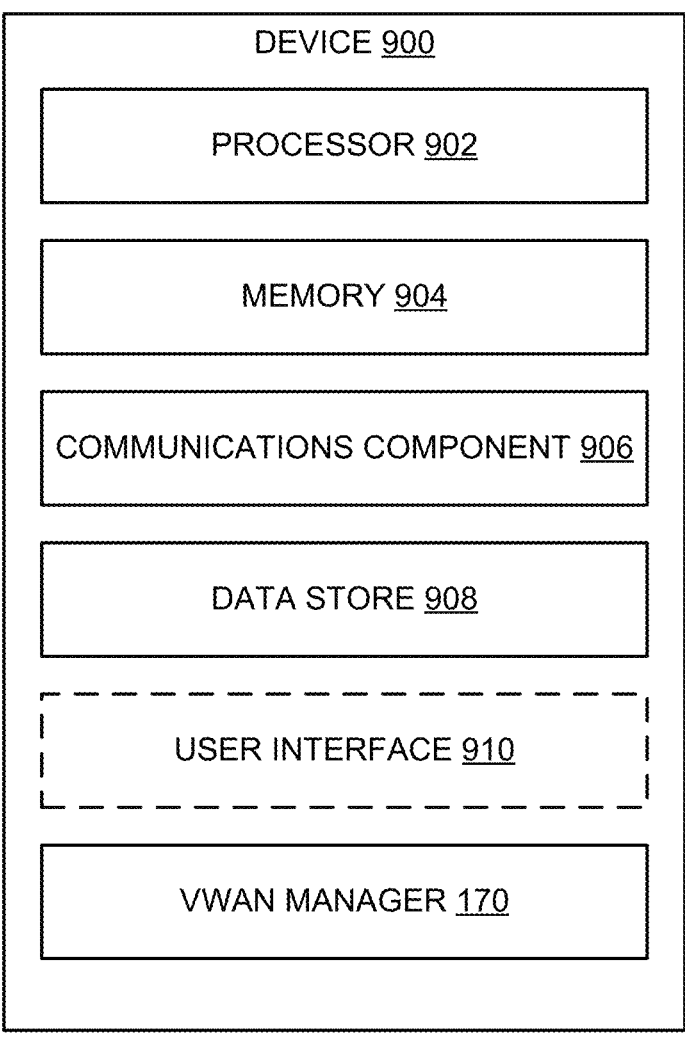
FIG. 9 is a schematic diagram of an example of a device for performing functions of vWAN topology management described herein, in accordance with aspects described herein

FIG. 9 illustrates an example of a device 900 including additional optional component details as those shown in FIG. 4. In one aspect, device 900 include processor 902, which may be similar to processor 402 for carrying out processing functions associated with one or more of components and functions described herein. Processor 902 can include a single or multiple set of processors or multi-core processors. Moreover, processor 902 can be implemented as an integrated processing system and/or a distributed processing system.

Device 900 further includes memory 904, which may be similar to memory 504 such as for storing local versions of operating systems (or components thereof) and/or applications being executed by processor 902, such as the vWAN manager 170, the vWAN interface 172, the vWAN optimizer 174, the network monitor 176, the vWAN maintenance component 178, etc. Memory 904 can include a type of memory usable by a computer, such as random access memory (RAM), read only memory (ROM), tapes, magnetic discs, optical discs, volatile memory, non-volatile memory, and any combination thereof.

Further, device 900 includes a communications component 906 that provides for establishing and maintaining communications with one or more other devices, parties, entities, etc. utilizing hardware, software, and services as described herein. Communications component 906 carries communications between components on device 900, as well as between device 900 and external devices, such as devices located across a communications network and/or devices serially or locally connected to device 900. For example, communications component 906 may include one or more buses, and may further include transmit chain components and receive chain components associated with a wireless or wired transmitter and receiver, respectively, operable for interfacing with external devices.

Additionally, device 900 may include a data store 908, which can be any suitable combination of hardware and/or software, that provides for mass storage of information, databases, and programs employed in connection with aspects described herein. For example, data store 908 may be or may include a data repository for operating systems (or components thereof), applications, related parameters, etc. not currently being executed by processor 902. In addition, data store 908 may be a data repository for the vWAN manager 170.

Device 900 may optionally include a user interface component 910 operable to receive inputs from a user of device 900 and further operable to generate outputs for presentation to the user. User interface component 910 may include one or more input devices, including but not limited to a keyboard, a number pad, a mouse, a touch-sensitive display, a navigation key, a function key, a microphone, a voice recognition component, a gesture recognition component, a depth sensor, a gaze tracking sensor, a switch/button, any other mechanism capable of receiving an input from a user, or any combination thereof. Further, user interface component 910 may include one or more output devices, including but not limited to a display, a speaker, a haptic feedback mechanism, a printer, any other mechanism capable of presenting an output to a user, or any combination thereof.

Device 900 additionally includes the vWAN manager 170 for managing vWAN deployment on the WAN 110, vWAN interface 172 for receiving a set of the metropolitan regions and a number of expected connections for each metropolitan region, vWAN optimizer 174 for selecting a plurality of virtual WAN hub locations at selected datacenters within the WAN, network monitor 176 for obtaining latency measurements from different metropolitan regions to different entry points of the WAN 110, etc.

In an aspect, the opportunity of improving virtual WAN connection latencies by placing hubs in alternate locations is due to the difference in the minimum latency to the geo-default POP and other PoPs. The opportunity can be quantified as a ratio between the minimum latency to the geo-default PoP and other PoPs. Minimum latencies allow a fairer comparison by reducing the effects of transient phenomenon (e.g., congestion, queuing delays) on measured latency. For example, the ratio may be computed based on the minimum latency of the geo-default POP and the minimum latency among all other PoPs in a ten-minute time window for each client metro. Some metros have more uniform measurements across time and thus contribute more samples for comparison in more ten-minute time windows than others. To prevent these client metros from skewing the analysis, the sample sizes can be normalized by selecting 50 random samples across all ten-minute time windows for each client metro. Client metros with fewer than 50 samples are discarded in the comparison since there is not sufficient data for them.

FIG. 10 shows the cumulative distribution function (CDF) 1000 of $\log_{10}$ ratio of minimum latency of the geo-default POP to the fastest non-default PoP. The graph shows the median, 90th and 95th percentile latency computed over ten-minute time windows for 100 metros (5000 data points). For about 20% of the windows, placing a virtual WAN hub at a PoP that is not geographically closest would result in better median latency for the enterprise. The performance gap between geo-default and other PoPs is wider at higher percentiles.

The previous results were across all sampled time windows for all metros. For each of the individual metros the opportunity for improvement is related to the number of sampled windows where the fastest POP was not the geo-default PoP. For about 75% of metros, there were few samples (0-5 out of 50) where any POP was faster than the geo-default. However, for the $90^{th}$ and $95^{th}$ percentiles, this drops to 58% and 47% respectively, indicating tail latencies are more often better at other PoPs. While it was rare that another PoP is always fastest, there is a fairly even distribution of how often an alternate POP was faster than the geo-default between 10-100% samples. Thus, in real-world networks, there is an opportunity to improve latency through placement of virtual WAN hubs using a dynamic mechanism because the geo-default Pop is not always fastest.

Of the 100 client metros used above, there were 20 metros for which the geo-default and the anycast-default PoPs were different. For these 20 metros, the results show that for 8 metros, the Anycast-default had lowest median latency in only 0-5 of 50 samples, and only 3 metros found that Anycast-default was almost always fastest. Accordingly, Anycast often does not always select the lowest-latency POP, so there is an opportunity to improve latency by placing a hub at a location which is not chosen often by anycast.

Another relevant question is how long an alternate POP can sustain its performance benefit; it may be that performance gains are transient, so the delay of reconfiguring a network precludes using a faster PoP. The long-term sustainability of alternate location selection was tested using 50 samples in larger windows: 1 hour, 10 hours, or 24 hours. If the performance benefit was only temporary, then with larger windows most of the samples would not see faster performance from an alternate PoP. In the test sample, there were 95 metros with enough data for samples at 1-hour granularity, 84 at 10 hours, and 72 at 24 hours. For larger windows, it is even more likely that an alternate POP will outperform the geo-default over 24 hours. This indicates that alternate PoPs often stay faster for at least 24 hours. These results indicate that the faster POP performs better than geo-default for longer periods and optimizing the latency for these metros can improve performance for a period of time.

The analysis shows that placing virtual WAN hubs in a POP further away from the client branch office than the geo-default POP can improve the latency in about 20% of the metro locations. Additionally, for metros where the geo-defaults were not the same as anycast-defaults, the anycast-default was fastest for only 40% of metros. Therefore, there is an opportunity for the vWAN manager 170 to improve latency via a hub placement for virtual WAN clients. Moreover, while hub placement should be dynamic due to changing latency patterns, the latency patterns are stable enough that the vWAN manager 170 does not need to respond at a minute or hour timescale, and it suffices to be stable for 24 hours or longer timescales.

Figure 11:
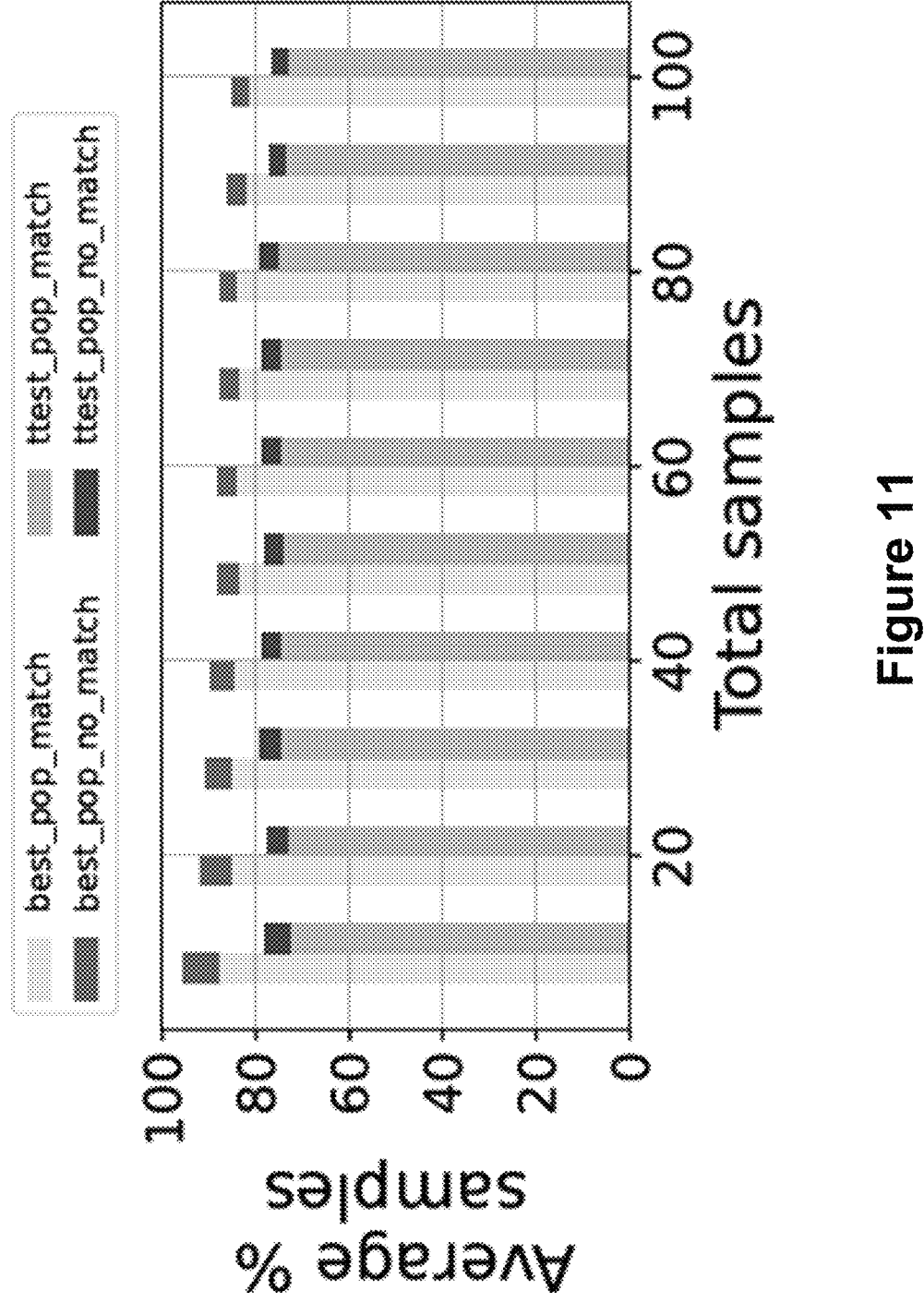
FIG. 11 shows the lowest-latency POP identified by averaging a small number of samples.

Real-world datasets may not have measurements for all metros for all time periods. As a result, there may sometimes be only a few measurements available with which to make a hub placement decision. Smaller sample sizes were tested to understand how having limited data impacts decision-making. FIG. 11 shows the lowest-latency POP identified by averaging a small number of samples (10, 20, 30 etc.) (labeled best-pop) against the lowest-latency POP considering all measured data (labeled best-pop-overall). FIG. 11 shows how often best-pop matches best-pop-overall and how often it is different (no-match). Not all windows have the required number of samples, so the two groups do not add to 100%. These results show that with only 20 measurement samples per window, the best POP can be selected about 85% of the time.

With so few samples, whether the performance differences between PoPs were statistically significant was also evaluated. A pairwise t-test for all PoPs for a given metro was run, and the partial ordering between the Pops was calculated to identify the lowest latency PoP, ttest-pop that offers the lowest significant median latency. For some metros, this ordering is incomplete (e.g., between some PoPs latency differences fail the t-test); for such cases, the t-test fails. FIG. 11 shows how often the ttest-pop matches the best-pop-overall. Surprisingly, the t-test results were much worse than the simple average, even with high numbers of samples. While it had very few mismatches (labeled ttest_pop_no_match), it also had many fewer correct matches. Therefore, averaging latencies from 20 samples identifies the fastest POP with a probability of about 77-85%. Thus, measurements with as few as 20 samples per metro may be used to select a PoP, but performance is improved with more measurements.

Figure 12B:
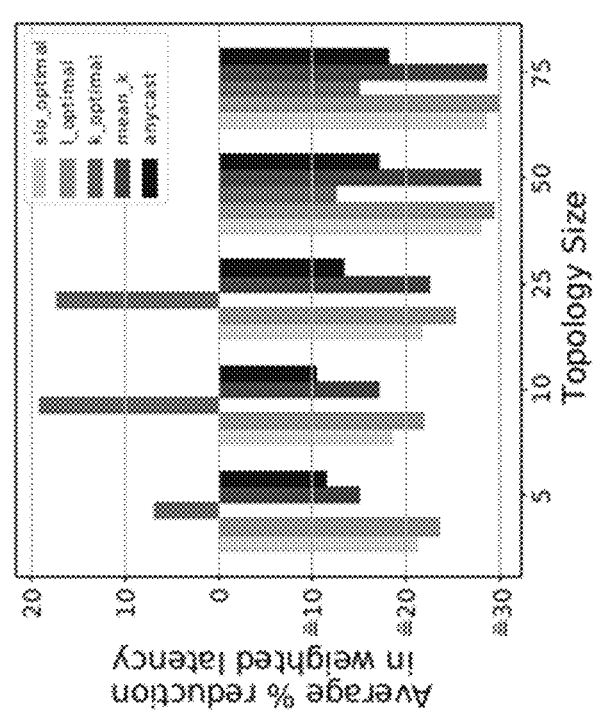
FIGS. 12A and 12B are charts comparing latency using various algorithms for selecting vWAN hub locations.
Figure 12A:
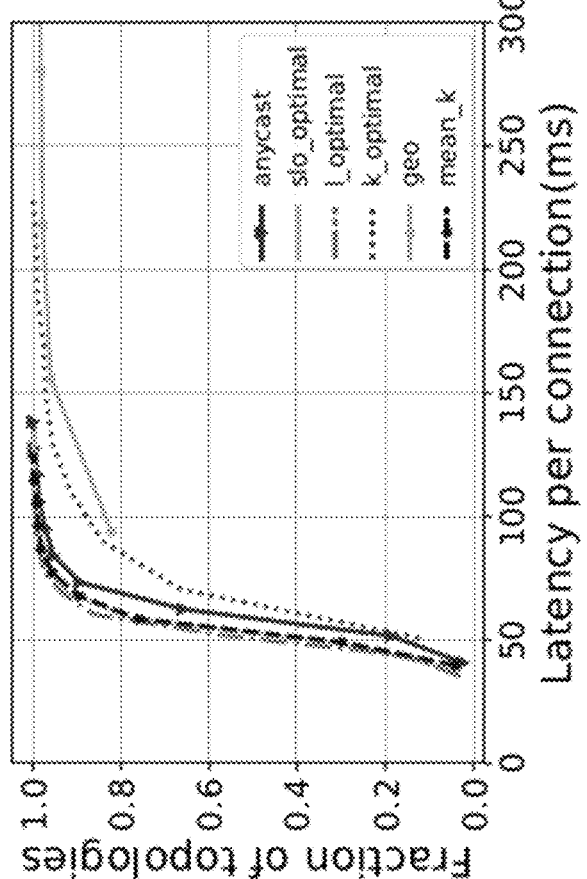

FIG. 12A illustrates the latency of connections for various modes of optimization tested using synthetic customer topologies. FIG. 12B illustrates the latency reduction from a default of closest geographical selection (geo). Anycast refers to selection of the location determined by anycast routing. l_optimal refers to the latency optimal mode. k_optimal refers to the cost optimal mode. slo_optimal refers to the additional constraint of satisfying a target latency selected by the enterprise client. In the simulation, the anycast latency for each region was used as the target latency. That is slo_optimal would never select a location that was worse than anycast routing. mean_k refers to selection of an average point on the Pareto frontier. As best seen in FIG. 12B, the l_optimal, slo_optimal, and mean_k always reduce the latency compared to geo selection and outperform anycast selection. k_optimal does not improve latency for small topology sizes because of the attempt to minimize the number of PoPs, but does improve latency for large topology sizes while also reducing costs.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Accordingly, in one or more aspects, one or more of the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), and floppy disk where disks usually reproduce data magnetically, while discs reproduce data optically with lasers. Combinations of the above should also be included within the scope of computer-readable media. Non-transitory computer-readable media excludes transitory signals.

The following numbered clauses provide an overview of aspects of the present disclosure:

Clause 1. A wireless wide area network (WAN), comprising: a plurality of geographically distributed entry points including routers connected to other networks; a plurality of edge datacenters, each edge datacenter associated with one of the plurality of geographically distributed entry points, each edge datacenter including computing resources capable of hosting a virtual WAN hub; and a management datacenter including a memory storing computer-executable instructions, and at least one processor configured to execute the computer-executable instructions to: obtain latency measurements from different metropolitan regions to the plurality of geographically distributed entry points of the WAN; receive, from an enterprise client, a set of the metropolitan regions and a number of expected connections for each metropolitan region; and select a plurality of virtual WAN hub locations at selected edge datacenters of the plurality of edge datacenters, each selected edge datacenter being associated with a non-empty subset of the metropolitan regions, wherein a weighted latency for the plurality of virtual WAN hub locations based on the latency measurements and the expected connections is minimized for a number of the selected edge datacenters.

Clause 2. The WAN of clause 1, wherein to obtain the latency measurements, the at least one processor is configured to execute the computer-executable instructions to: measure, for each of a plurality of clients, a latency from a respective client to an entry point of the WAN for a service within the WAN; determine a metropolitan region of the respective client and the entry point for each latency measurement; and aggregate the latency measurements for clients within metropolitan regions for each entry point having a threshold number of latency measurements to determine the latency measurement between a metropolitan region and an entry point.

Clause 3. The WAN of clause 1 or 2, wherein the at least one processor is configured to execute the computer-executable instructions to receive, from the enterprise client, a service level objective defining an expected latency for one or more of the metropolitan regions, wherein selecting the plurality of virtual WAN hub locations comprises selecting only edge datacenters associated with entry points that satisfy the expected latency for a metropolitan region.

Clause 4. The WAN of any of clauses 1-3, wherein to select the plurality of virtual WAN hub locations, the at least one processor is configured to execute the computer-executable instructions to solve a mixed integer linear program (MILP) to minimize a sum of latencies for selected entry points across the set of metropolitan regions for the number of expected connections for each metropolitan region.

Clause 5. The WAN of clause 4, wherein the MILP is subject to: a first constraint that connections from one client metropolitan region go to only one virtual WAN hub associated with an entry point; and a second constraint that only one edge datacenter associated with an entry point is selected for one metropolitan region.

Clause 6. The WAN of clause 5, wherein the MILP is further subject to a third constraint that the number of selected edge datacenters is less than a threshold.

Clause 7. The WAN of clause 6, wherein the at least one processor is configured to execute the computer-executable instructions to solve the MILP for different values of the threshold to determine points on a Pareto optimal frontier for the latency and the number of selected edge datacenters.

Clause 8. The WAN of clause 7, wherein the at least one processor is configured to execute the computer-executable instructions to select the number of edge datacenters based on a mean of a minimum feasible number of edge datacenters and a lowest latency number of edge datacenters.

Clause 9. The WAN of clause 4, wherein the at least one processor is configured to execute the computer-executable instructions to select a number of virtual WAN hubs to instantiate at each of the plurality of virtual WAN hub locations based on the number of expected connections for each metropolitan region associated with a respective edge datacenter and a maximum number of connections per virtual WAN hub.

Clause 10. The WAN of any of clauses 1-9, wherein the at least one processor is configured to execute the computer-executable instructions to: evaluate an average latency for the virtual WAN over a plurality of time windows using an exponentially weighted moving average; reselect the plurality of virtual WAN hub locations based on the average latency; and migrate one or more virtual WAN hubs to a newly selected edge datacenter from a datacenter associated with an edge datacenter that is no longer selected.

Clause 11. A method comprising: obtaining latency measurements from different metropolitan regions to different entry points of a wide area network (WAN); receiving, from an enterprise client, a set of the metropolitan regions and a number of expected connections for each metropolitan region; and selecting a plurality of virtual WAN hub locations at selected datacenters within the WAN, each selected datacenter being associated with an entry point of the WAN and a non-empty subset of the metropolitan regions, wherein a weighted latency for the plurality of virtual WAN hub locations based on the latency measurements and the expected connections is on a Pareto optimal frontier of the weighted latency for a number of the selected datacenters.

Clause 12. The method of clause 11, wherein obtaining the latency measurements comprises: measuring, for each of a plurality of clients, a latency from a respective client to an entry point of the WAN for a service within the WAN; determining a metropolitan region of the respective client and the entry point for each latency measurement; and aggregating the latency measurements for clients within metropolitan regions for each entry point having a threshold number of latency measurements to determine the latency measurement between a metropolitan region and an entry point.

Clause 13. The method of clause 11 or 12, further comprising receiving, from the enterprise client, a service level objective defining an expected latency for one or more of the metropolitan regions, wherein selecting the plurality of virtual WAN hub locations comprises selecting only datacenters associated with entry points that satisfy the expected latency for a metropolitan region.

Clause 14. The method of any of clauses 11-13, wherein selecting the plurality of virtual WAN hub locations comprises solving a mixed integer linear program (MILP) to minimize a sum of latencies for selected entry points across the set of metropolitan regions for the number of expected connections for each metropolitan region.

Clause 15. The method of clause 14, wherein the MILP is subject to: a first constraint that connections from one client metropolitan region go to only one virtual WAN hub associated with an entry point; and a second constraint that only one datacenter associated with an entry point is selected for one client metropolitan.

Clause 16. The method of clause 15; wherein the MILP is further subject to a third constraint that the number of entry points associated with a hub is less than a threshold.

Clause 17. The method of clause 16, wherein selecting the plurality of virtual WAN hub locations comprises solving the MILP for different values of the threshold to determine points on a Pareto optimal frontier.

Clause 18. The method of clause 17, wherein selecting the plurality of virtual WAN hub locations comprises selecting a number of entry points based on a mean of a minimum feasible number of entry points and a lowest latency number of entry points.

Clause 19. The method of clause 14, further comprising selecting a number of virtual WAN hubs to instantiate at each of the plurality of virtual WAN hub locations based on the number of expected connections for each metropolitan region associated with an entry point and a maximum number of connections per virtual WAN hub.

Clause 20. The method of any of clauses 11-19, further comprising: evaluating an average latency over a plurality of time windows using an exponentially weighted moving average; reselecting the plurality of virtual WAN hub locations based on the average latency; and migrating one or more virtual WAN hubs to a datacenter associated with a newly selected entry point from a datacenter associated with an entry point that is no longer selected.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described herein that are known or later come to be known to those of ordinary skill in the art are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A wireless wide area network (WAN), comprising:
a plurality of geographically distributed entry points including routers connected to other networks;
a plurality of edge datacenters, each edge datacenter associated with one of the plurality of geographically distributed entry points, each edge datacenter including computing resources capable of hosting a virtual WAN hub; and
a management datacenter including a memory storing computer-executable instructions, and at least one processor configured to execute the computer-executable instructions to:
obtain latency measurements from a plurality of clients, each client associated with one of a plurality of different metropolitan regions, to the plurality of geographically distributed entry points of the WAN;
receive, from an enterprise client, a set of the metropolitan regions and a number of expected connections for each metropolitan region; and
instantiate a plurality of virtual WAN hubs at selected edge datacenters of the plurality of edge datacenters, each selected edge datacenter being associated with a non-empty subset of the metropolitan regions, wherein a weighted latency for the selected edge datacenters based on the latency measurements and the expected connections is minimized for a number of the selected edge datacenters.

2. The WAN of claim 1, wherein to obtain the latency measurements, the at least one processor is configured to execute the computer-executable instructions to:

measure, for each of a plurality of clients, a latency from a respective client to an entry point of the WAN for a service within the WAN;

determine a metropolitan region of the respective client and the entry point for each latency measurement; and aggregate the latency measurements for clients within metropolitan regions for each entry point having a threshold number of latency measurements to determine the latency measurement between a metropolitan region and an entry point.

3. The WAN of claim 1, wherein the at least one processor is configured to execute the computer-executable instructions to receive, from the enterprise client, a service level objective defining an expected latency for one or more of the metropolitan regions, wherein to instantiate the plurality of virtual WAN hubs, the at least one processor is configured to execute the computer-executable instructions to select only edge datacenters associated with entry points that satisfy the expected latency for a metropolitan region.

4. The WAN of claim 1, wherein to instantiate the plurality of virtual WAN hubs, the at least one processor is configured to execute the computer-executable instructions to solve a mixed integer linear program (MILP) to minimize a sum of latencies for selected entry points across the set of metropolitan regions for the number of expected connections for each metropolitan region.

5. The WAN of claim 4, wherein the MILP is subject to:

a first constraint that connections from one client metropolitan region go to only one virtual WAN hub associated with an entry point; and a second constraint that only one edge datacenter associated with an entry point is selected for one metropolitan region.

6. The WAN of claim 5, wherein the MILP is further subject to a third constraint that the number of selected edge datacenters is less than a threshold.

7. The WAN of claim 6, wherein the at least one processor is configured to execute the computer-executable instructions to solve the MILP for different values of the threshold to determine points on a Pareto optimal frontier for the latency and the number of selected edge datacenters.

8. The WAN of claim 7, wherein the at least one processor is configured to execute the computer-executable instructions to select the number of edge datacenters based on a mean of a minimum feasible number of edge datacenters and a lowest latency number of edge datacenters.

9. The WAN of claim 4, wherein the at least one processor is configured to execute the computer-executable instructions to select a number of virtual WAN hubs to instantiate at each of the selected datacenters based on the number of expected connections for each metropolitan region associated with a respective edge datacenter and a maximum number of connections per virtual WAN hub.

10. The WAN of claim 1, wherein the at least one processor is configured to execute the computer-executable instructions to:

evaluate an average latency for the virtual WAN over a plurality of time windows using an exponentially weighted moving average;

reselect the selected datacenters based on the average latency; and migrate one or more virtual WAN hubs to a newly selected edge datacenter from a datacenter associated with an edge datacenter that is no longer selected.

11. A method comprising:

obtaining latency measurements from a plurality of clients, each client associated with one of a plurality of different metropolitan regions, to different entry points of a wide area network (WAN);

receiving, from an enterprise client, a set of the metropolitan regions and a number of expected connections for each metropolitan region; and instantiating a plurality of virtual WAN hubs at selected datacenters within the WAN, each selected datacenter being associated with an entry point of the WAN and a non-empty subset of the metropolitan regions, wherein a weighted latency for the selected datacenters based on the latency measurements and the expected connections is on a Pareto optimal frontier of the weighted latency for a number of the selected datacenters.

12. The method of claim 11, wherein obtaining the latency measurements comprises:

measuring, for each of a plurality of clients, a latency from a respective client to an entry point of the WAN for a service within the WAN;

determining a metropolitan region of the respective client and the entry point for each latency measurement; and aggregating the latency measurements for clients within metropolitan regions for each entry point having a threshold number of latency measurements to determine the latency measurement between a metropolitan region and an entry point.

13. The method of claim 11, further comprising receiving, from the enterprise client, a service level objective defining an expected latency for one or more of the metropolitan regions, wherein instantiating the plurality of virtual WAN hubs comprises selecting only datacenters associated with entry points that satisfy the expected latency for a metropolitan region.

14. The method of claim 11, wherein instantiating the plurality of virtual WAN hubs comprises solving a mixed integer linear program (MILP) to minimize a sum of latencies for selected entry points across the set of metropolitan regions for the number of expected connections for each metropolitan region.

15. The method of claim 14, wherein the MILP is subject to:

a first constraint that connections from one client metropolitan region go to only one virtual WAN hub associated with an entry point; and a second constraint that only one datacenter associated with an entry point is selected for one client metropolitan.

16. The method of claim 15; wherein the MILP is further subject to a third constraint that the number of entry points associated with a hub is less than a threshold.

17. The method of claim 16, wherein instantiating the plurality of virtual WAN hubs comprises solving the MILP for different values of the threshold to determine points on a Pareto optimal frontier.

18. The method of claim 17, wherein instantiating the plurality of virtual WAN hubs comprises selecting a number of entry points based on a mean of a minimum feasible number of entry points and a lowest latency number of entry points.

19. The method of claim 14, further comprising selecting a number of virtual WAN hubs to instantiate at each of the selected datacenters based on the number of expected connections for each metropolitan region associated with an entry point and a maximum number of connections per virtual WAN hub.

20. The method of claim 11, further comprising:

evaluating an average latency over a plurality of time windows using an exponentially weighted moving average;

reselecting the selected datacenters based on the average latency; and migrating one or more virtual WAN hubs to a datacenter associated with a newly selected entry point from a datacenter associated with an entry point that is no longer selected.

\* \* \* \* \*